United States Patent
Xu et al.

(10) Patent No.: US 10,993,277 B2
(45) Date of Patent: Apr. 27, 2021

(54) ENHANCED PDCP DUPLICATION HANDLING AND RLC FAILURE HANDLING

(71) Applicant: Apple Inc., Cupertino, CA (US)

(72) Inventors: Fangli Xu, Beijing (CN); Dawei Zhang, Saratoga, CA (US); Haijing Hu, Beijing (CN); Longda Xing, San Jose, CA (US); Murtaza A. Shikari, Mountain View, CA (US); Sethuraman Gurumoorthy, San Jose, CA (US); Sree Ram Kodali, Sunnyvale, CA (US); Srinivasan Nimmala, San Jose, CA (US); Srirang A. Lovlekar, Cupertino, CA (US); Xu Ou, San Jose, CA (US); Yuqin Chen, Shenzhen (CN)

(73) Assignee: Apple Inc., Cupertino, CA (US)

( * ) Notice: Subject to any disclaimer, the term of this patent is extended or adjusted under 35 U.S.C. 154(b) by 41 days.

(21) Appl. No.: 16/572,396

(22) Filed: Sep. 16, 2019

(65) Prior Publication Data
US 2020/0178331 A1  Jun. 4, 2020

Related U.S. Application Data

(60) Provisional application No. 62/775,002, filed on Dec. 4, 2018.

(51) Int. Cl.
*H04W 76/15* (2018.01)
*H04W 36/02* (2009.01)
*H04W 28/02* (2009.01)

(52) U.S. Cl.
CPC ....... *H04W 76/15* (2018.02); *H04W 28/0252* (2013.01); *H04W 36/026* (2013.01)

(58) Field of Classification Search
CPC ..... H04W 76/15; H04W 28/02; H04W 36/02; H04W 28/0252; H04W 36/026; H04W 28/0231
See application file for complete search history.

(56) References Cited

U.S. PATENT DOCUMENTS

| | | | |
|---|---|---|---|
| 9,173,147 B2 | 10/2015 | Gao | |
| 10,327,223 B2 | 6/2019 | Lee | |
| 10,349,463 B2 | 7/2019 | Pelletier | |
| 2018/0310202 A1 | 10/2018 | Lohr | |
| 2018/0368132 A1 | 12/2018 | Babaei | |
| 2018/0375621 A1 | 12/2018 | Turtinen | |
| 2019/0132897 A1 | 5/2019 | Pradas | |
| 2019/0200262 A1 | 6/2019 | Kim | |
| 2019/0215725 A1 | 7/2019 | Kim | |
| 2019/0254100 A1* | 8/2019 | Yu | H04W 76/18 |
| 2020/0059821 A1* | 2/2020 | Wirth | H04L 5/0094 |
| 2020/0107392 A1* | 4/2020 | Yi | H04W 76/38 |

* cited by examiner

*Primary Examiner* — Kyaw Z Soe
(74) *Attorney, Agent, or Firm* — Kowert, Hood, Munyon, Rankin & Goetzel, P.C.

(57) ABSTRACT

Apparatuses, systems, and methods for a wireless device to perform enhanced duplication handling and/or failure handling procedures with a network, including one or more base station. The wireless device may connect to a network using multiple paths. The wireless device may autonomously determine whether to duplicate one or more transmissions to the network on the multiple paths. In the event of a radio link control failure associated with one bearer, the wireless device may suspend transmission of the failed bearer while continuing to use one or more other bearers for transmission.

20 Claims, 17 Drawing Sheets

| 81 | Delay Critical GBR | 11 | 5ms | $10^{-5}$ | 160B | 2000ms | Remote control (see TS 22.261 [2]) |
| --- | --- | --- | --- | --- | --- | --- | --- |
| 82 | | 12 | 10ms NOTE 5 | $10^{-5}$ | 320B | 2000ms | Intelligent Transport Systems |
| 83 | | 13 | 20ms | $10^{-5}$ | 640B | 2000ms | Intelligent Transport Systems |
| 84 | | 19 | 10ms | $10^{-4}$ | 255B | 2000ms | Discreet Automation |
| 85 | | 22 | 10ms | $10^{-4}$ | 1358B NOTE 3 | 2000ms | Discreet Automation |
FIG. 16
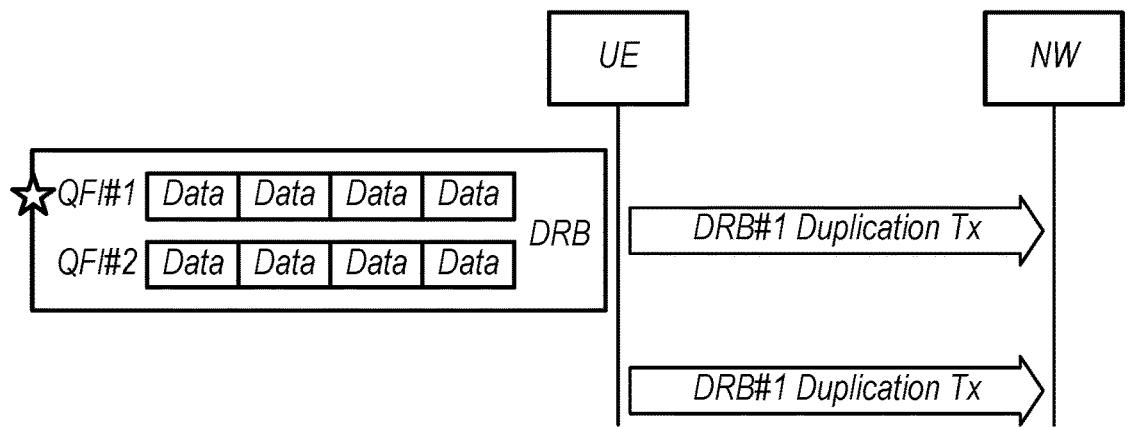
FIG. 17
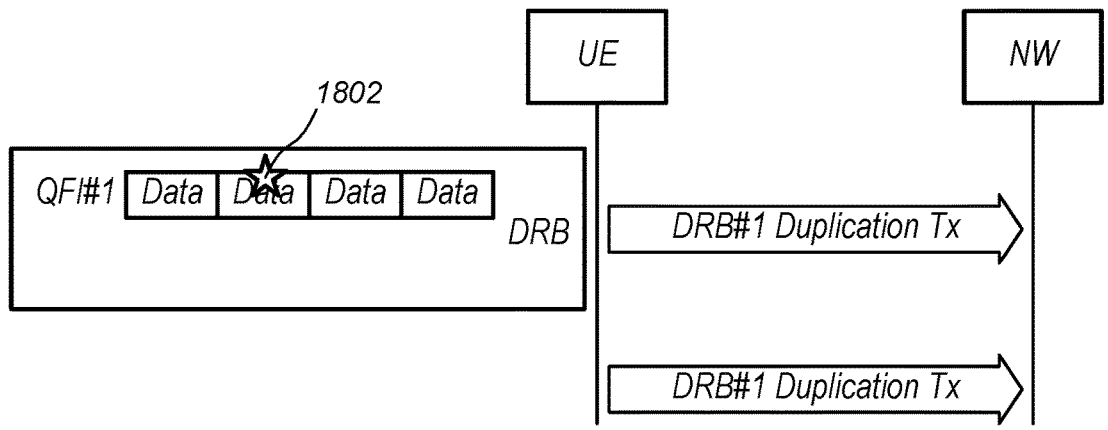
FIG. 18

ENHANCED PDCP DUPLICATION HANDLING AND RLC FAILURE HANDLING

PRIORITY CLAIM

This application claims priority to U.S. provisional patent application Ser. No. 62/775,002, entitled "Enhanced PDCP Duplication Handling and RLC Failure Handling," filed Dec. 4, 2018, which is hereby incorporated by reference in its entirety as though fully and completely set forth herein.

FIELD

The present application relates to wireless devices, and more particularly to apparatus, systems, and methods for a wireless device to perform duplication and failure handling procedures.

DESCRIPTION OF THE RELATED ART

Wireless communication systems are rapidly growing in usage. Further, wireless communication technology has evolved from voice-only communications to also include the transmission of data, such as Internet and multimedia content. Thus, improvements in the field are desired.

SUMMARY

Embodiments relate to apparatuses, systems, and methods to perform enhanced duplication handling and/or handling of a failure.

A user equipment device (UE) may connect to a network using two or more paths or bearers, e.g., a first path and second path. The paths may connect to one or more base stations. The UE may autonomously determine whether to duplicate one or more transmissions to the network on the multiple paths. The UE may duplicate no, some, or all portions of the one or more transmissions.

In the event of a radio link control failure associated with one bearer, the wireless device may suspend transmission of a failed bearer while continuing to use one or more other bearers for transmission.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIG. 16 is a table illustrating QoS requirements as indicated by 5QI, according to some embodiments;

FIGS. 17 and 18 are communication flow diagrams illustrating transmissions on a duplicated DRB from a UE to a NW, according to some embodiments;

Figure 1:
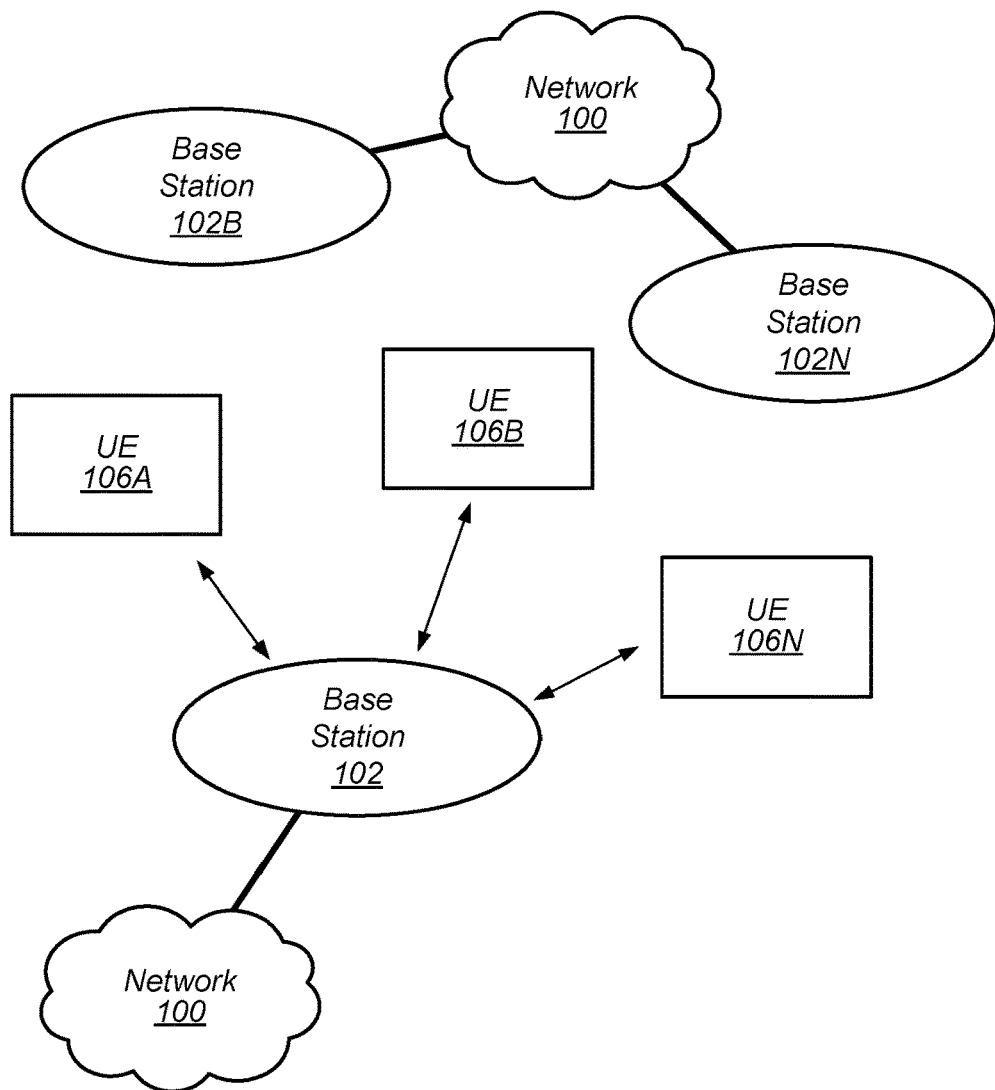
FIG. 1 illustrates an example wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Acronyms

Figure 2:
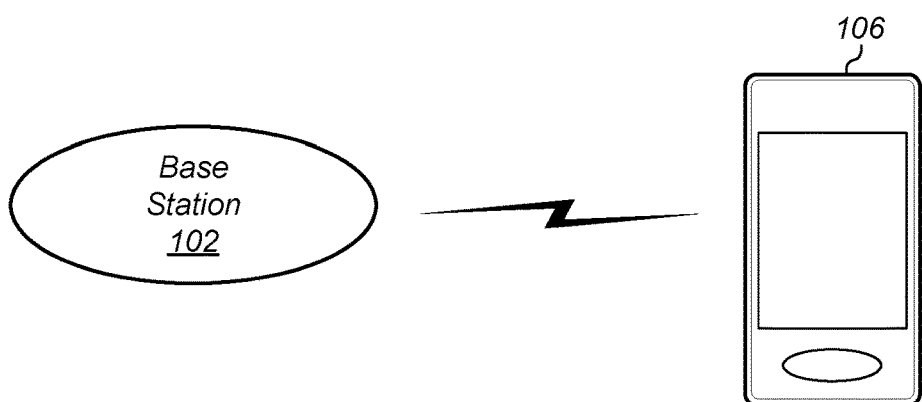
FIG. 2 illustrates a base station (BS) in communication with a user equipment (UE) device, according to some embodiments.

PDCP: packet data convergence protocol
RLC: radio link control
CSI: channel state information
RS: reference signal
MCG: master cell group
MN: master node
SCG: secondary cell group
SN: secondary node
CA: carrier aggregation
DC: dual connectivity FIGS. 1 and 2—Communication System FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102 which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102 may be a base transceiver station (BTS) or cell site (a "cellular base station"), and may include hardware that enables wireless communication with the UEs 106A through 106N.

The communication area (or coverage area) of the base station may be referred to as a "cell." The base station 102 and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102 is implemented in the context of LTE, it may alternately be referred to as an 'eNodeB' or 'eNB'. Note that if the base station 102 is implemented in the context of 5G NR, it may alternately be referred to as 'gNodeB' or 'gNB'.

As shown, the base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. In particular, the cellular base station 102 may provide UEs 106 with various telecommunication capabilities, such as voice, SMS and/or data services.

Base station 102 and other similar base stations operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102 may act as a "serving cell" for UEs 106A-N as illustrated in FIG. 1, each UE 106 may also be capable of receiving signals from (and possibly within communication range of) one or more other cells (which might be provided by other base stations 102B-N), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. Other configurations are also possible.

In some embodiments, base station 102 may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for multiple-input, multiple-output or "MIMO") for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include any number of antennas and may be configured to use the antennas to transmit and/or receive directional wireless signals (e.g., beams). Similarly, the BS 102 may also include any number of antennas and may be configured to use the antennas to transmit and/or receive directional wireless signals (e.g., beams).

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 3:
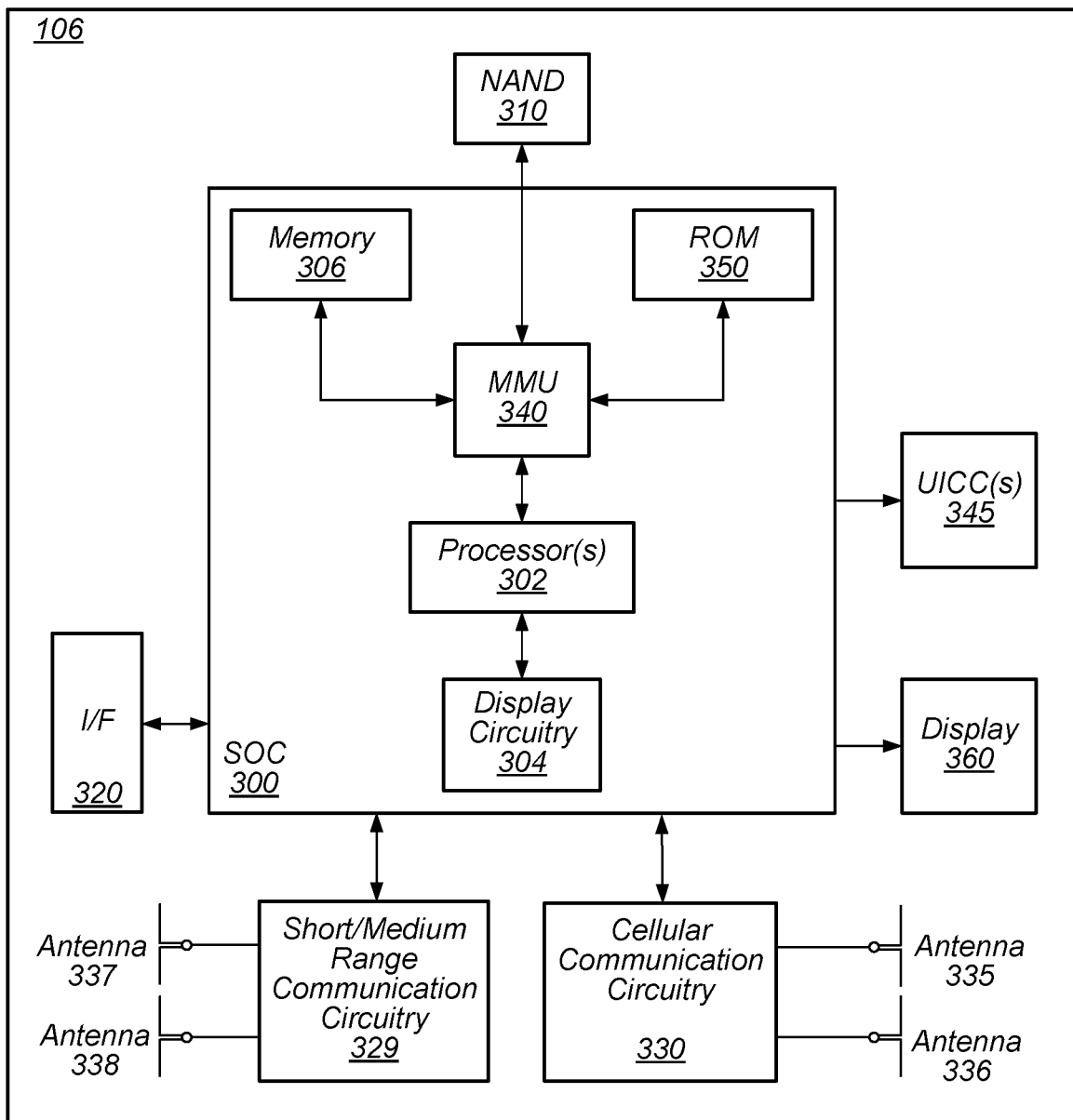
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT. The wireless device may also be configured transmit a request to attach to the second network node. The request may include an indication that the wireless device is capable of maintaining substantially concurrent connections with the first and second network nodes. Further, the wireless device may be configured to receive an indication that dual connectivity (DC) with the first and second network nodes has been established.

As described herein, the communication device 106 may include hardware and software components for implementing features for using RRC multiplexing to perform transmissions according to multiple radio access technologies in the same frequency carrier, as well as the various other techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
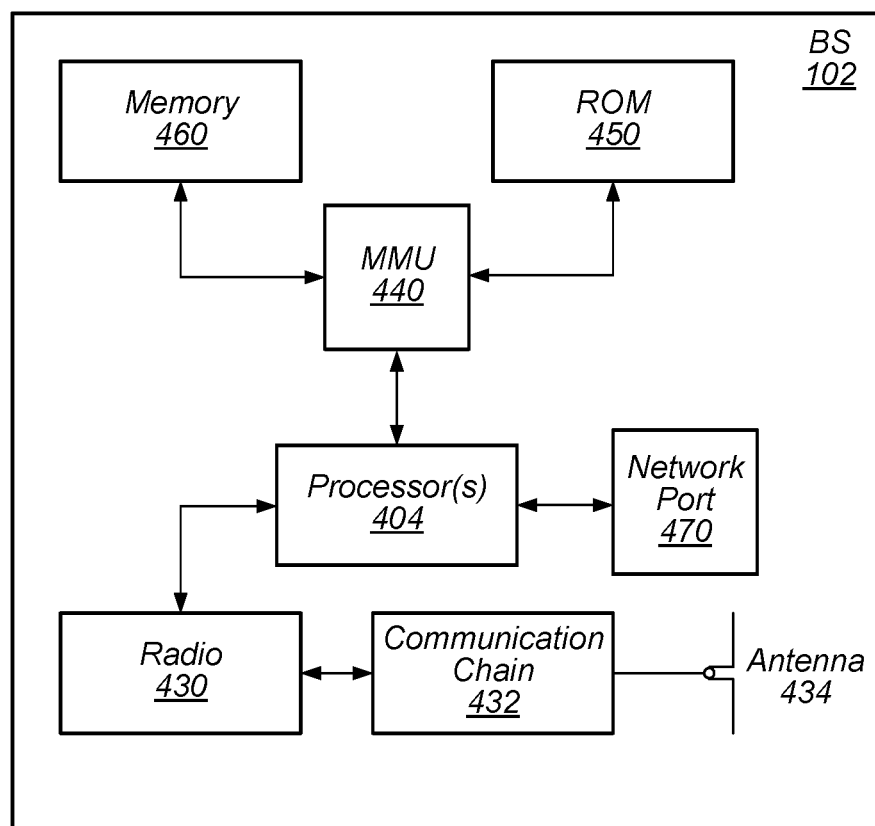
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNB s.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
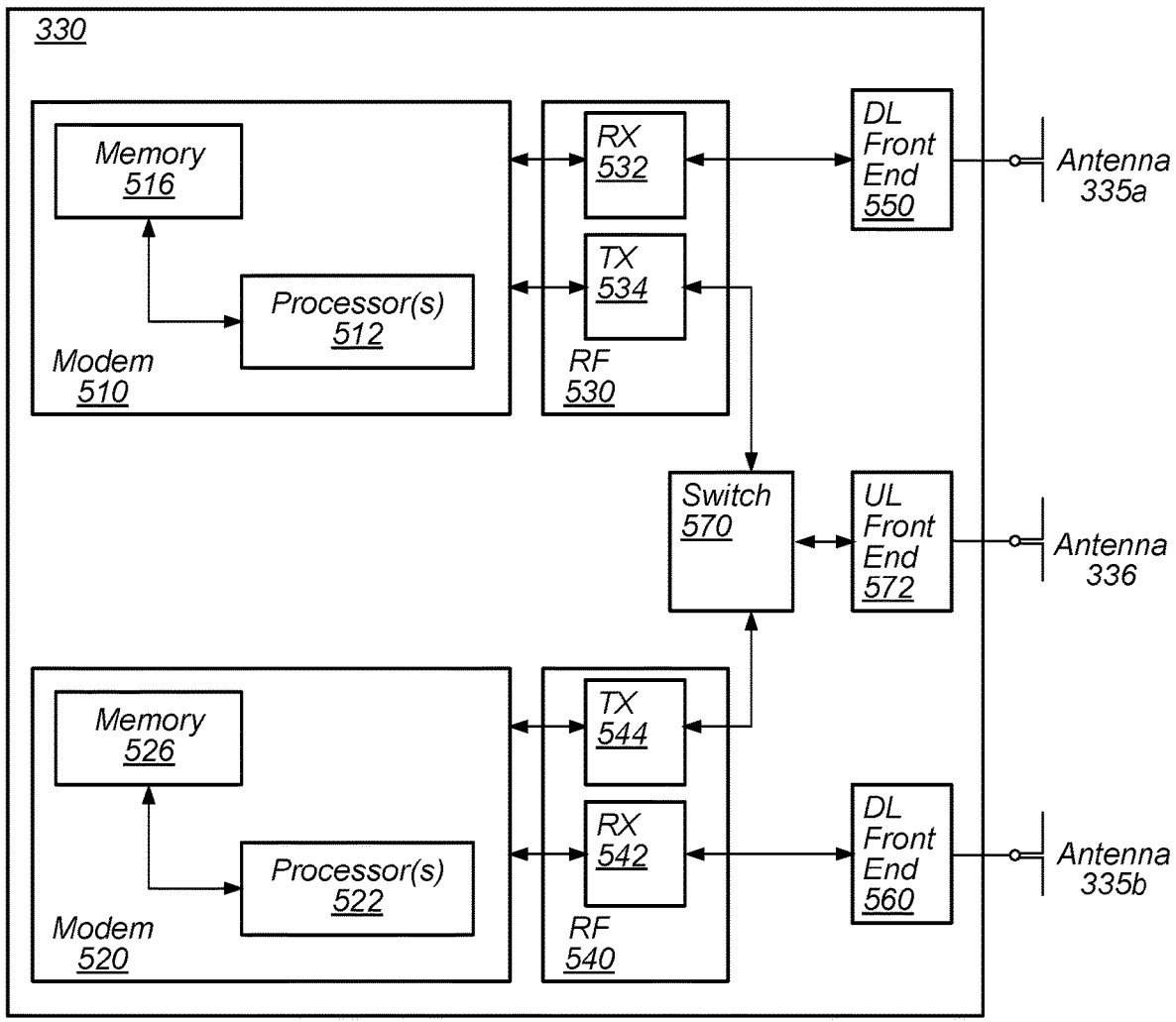
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, are also possible. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335*a-b* and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to transmit, via the first modem while the switch is in the first state, a request to attach to a first network node operating according to the first RAT and transmit, via the first modem while the switch is in a first state, an indication that the wireless device is capable of maintaining substantially concurrent connections with the first network node and a second network node that operates according to the second RAT. The wireless device may also be configured transmit, via the second radio while the switch is in a second state, a request to attach to the second network node. The request may include an indication that the wireless device is capable of maintaining substantially concurrent connections with the first and second network nodes. Further, the wireless device may be configured to receive, via the first radio, an indication that dual connectivity with the first and second network nodes has been established.

As described herein, the modem 510 may include hardware and software components for implementing features for using RRC multiplexing to perform transmissions according to multiple radio access technologies in the same frequency carrier, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing features for using RRC multiplexing to perform transmissions according to multiple radio access technologies in the same frequency carrier, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Figure 6:
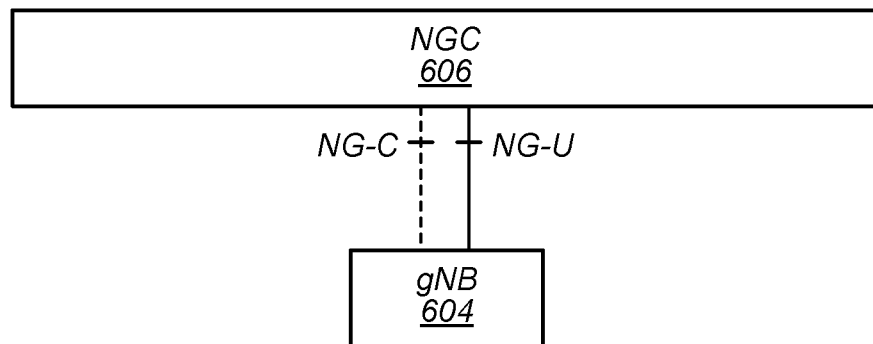
FIGS. 6 and 7 illustrate examples of a 5G NR base station (gNB), according to some embodiments.
Figure 7:
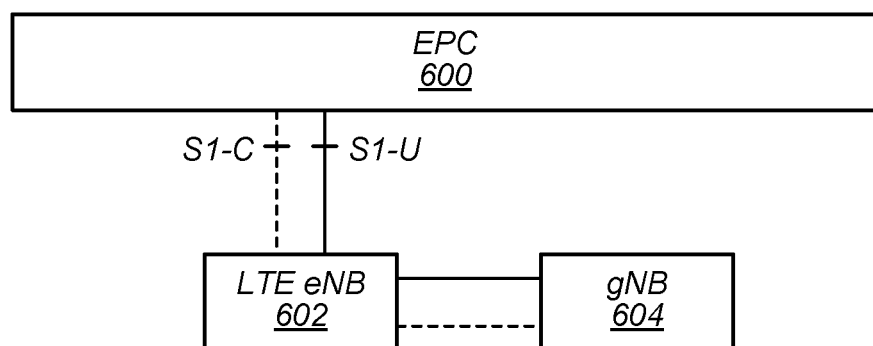

FIGS. 6-7—5G NR Architecture

In some implementations, fifth generation (5G) wireless communication will initially be deployed concurrently with other wireless communication standards (e.g., LTE). For example, whereas FIG. 6 illustrates a possible standalone (SA) implementation of a next generation core (NGC) network 606 and 5G NR base station (e.g., gNB 604), dual connectivity between LTE and 5G new radio (5G NR or NR), such as in accordance with the exemplary non-standalone (NSA) architecture illustrated in FIG. 7, has been specified as part of the initial deployment of NR. Thus, as illustrated in FIG. 7, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. In some instances, the gNB 604 may also have at least a user plane reference point with EPC network 600. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services. As will be appreciated, numerous other non-standalone architecture variants are possible.

FIG. 8—Duplication

Current wireless standards (e.g., 3GPP Release 15) may support various forms of duplication. Duplication may improve the reliability of duplicated transmissions through redundancy, e.g., by transmitting duplicated data multiple times and potentially over multiple paths. In various embodiments, duplication may be performed in carrier aggregation (CA) and/or dual connectivity (DC). In CA, transmissions may be duplicated in a single radio access technology (RAT). In DC, transmissions may be duplicated via two (or more) RATs, e.g., LTE and NR. Duplication may occur between the packet data convergence protocol (PDCP) layer and the radio link control (RLC) layer. For example, a radio bearer (e.g., a data radio bearer (DRB) or signaling radio bearer (SRB)) may not be duplicated at the PDCP layer, but may be duplicated at the RLC layer.

Duplication determination (e.g., a determination of whether or not to duplicate a transmission on multiple paths) may be based at least in part on service attributes. For example, duplication (or non-duplication) may be selected and performed in response to quality of service (QoS), e.g., based on QoS class indicator (QCI), QoS flow ID (QFI), and/or 5G QoS Indicator (5QI). 5QI may be transmitted as an information element (IE). QoS may specify parameters such as packet loss rate, packet delay budget, bit rate (guaranteed or non-guaranteed), etc. Similarly, duplication determination may be based on packet type, application type, etc. In other words, duplication determination may be based on an indicated or determined QoS requirement of an uplink transmission (e.g., packet(s), flow(s), etc.).

Radio link quality and transmission link quality may trigger or correlate with the activation and/or deactivation of duplication. For example, a deterioration in radio link quality may lead to activation of duplication, e.g., in order to maintain reliability. A wireless device (e.g., UE 106) may send measurement reports to a base station (e.g., BS 102), and the BS may activate or deactivate duplication based on the measurement report(s). For a signaling radio bearer (SRB), activation and/or deactivation of duplication may generally be signaled by radio resource control (RRC) signaling. For a data radio bearer (DRB), activation and/or deactivation of duplication may generally be signaled by media access control (MAC) control element (CE). Further, in DC, duplication activation and/or deactivation may require coordination between multiple network nodes. Backhaul delay may delay activation and/or deactivation of duplication. The process of signaling (e.g., including measurement reports and instructions to activate/deactivate duplication) may take time.

It may be desirable to reduce or eliminate this delay. During the delay, some resources may be used for unnecessary duplication and/or reliability may be reduced (e.g., in a case that duplication would be beneficial).

Further, according to current standards, all packets/data of a duplicated bearer (DRB/SRB) (e.g., at the PDCP) may be transmitted redundantly (e.g., duplicated) while duplication is activated. Thus, duplication may not distinguish different reliability requirements of different packets within the bearer. Duplication of packets that do not have high reliability requirements may be an inefficient use of resources (e.g., time, bandwidth, transmission power, etc.). Conversely, no packets may be transmitted redundantly on a bearer while duplication is not active. Such non-duplication may not guarantee the reliability requirement of some packets.

It may be desirable to allow for increased flexibility and control in duplication. In particular, it may be desirable to duplicate only some packets or data flows instead of making duplication determinations at the bearer level. For example, improvements in efficiency, reliability, and/or performance may be achieved by duplicating only specific packets or data flows based on reliability requirements, e.g., duplicating packets or flows with high priority, critical, or time-sensitive content or signaling.

Further, according to current standards, a network (e.g., via a BS) may schedule uplink (UL) transmissions according to a UE's UL radio quality (e.g., based on measurements performed by the BS and/or performed by the UE and reported to the BS). Such scheduling may be performed dynamically or using configured grants. Dynamic scheduling may include allocation of resources to UEs via cell radio network temporary identifier (C-RNTI) on physical downlink control channel (PDCCH). Using a configured grant, the network may allocate UL resources (e.g., in one or more time/frequency locations) to UEs. Such a UL grant may provide resources for an initial hybrid automatic repeat request (HARQ) transmission. It may be desirable to provide more flexibility in UL grants, e.g., by including duplication indications in grants.

Figure 8:
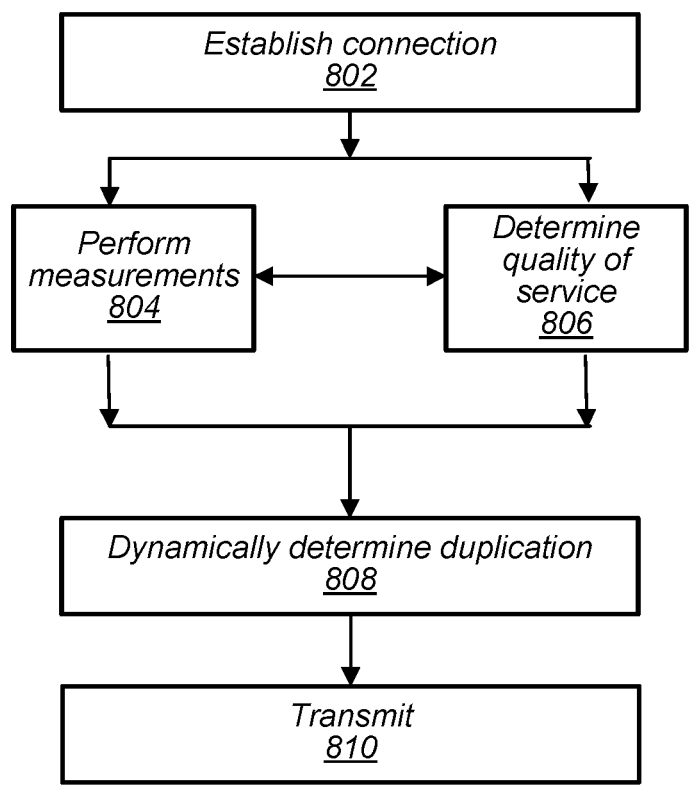
FIG. 8 illustrates techniques for duplication, according to some embodiments.

FIG. 8 illustrates exemplary techniques for increasing flexibility and control in duplication. The illustrated techniques may reduce and/or eliminate delays in activating and/or deactivating duplication, e.g., in CA, DC, or other contexts. The techniques may allow duplication determinations for flows and/or individual packets, e.g., in addition to or instead of duplication determinations at the bearer level. Further, the techniques may allow duplication indications in grants, thus improving timeliness and efficiency. Aspects of the method of FIG. 8 may be implemented by a wireless device, such as the UEs 106, in communication with one or more base station (e.g., BS 102) as illustrated in and described with respect to the Figures, or more generally in conjunction with any of the computer systems or devices shown in the Figures, among other devices, as desired. For example, one or more processors or processing elements of a UE 106 (e.g., processor(s) 302, or one or more processors associated with circuitry 329 or 330 (e.g., processor(s) 512, 522, etc.)) and/or BS 102 (e.g., processor(s) 404, etc.) may be configured, respectively to cause UE 106 and/or BS 102 to perform any or all elements of the method of FIG. 8. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

A wireless device (e.g., UE 106) may establish a connection with a cellular network via one or more base station (e.g., BS 102) (802). Establishing the connection may include establishing an RRC connection.

In some embodiments, the connection may include one or more carriers or paths using one or more RATs, e.g., the connection may include CA and/or DC. In some embodiments, the UE 106 may establish connections with multiple BSs, e.g., the connection may use an LTE BS (e.g., eNodeB) and an NR BS (e.g., gNb) (although embodiments described herein may also extend to WLAN RATs and nodes). Thus, the network (NW) may configure and the UE 106 may establish multiple transmission paths to the network. For example, a first path may include the PDCP layer of the UE, a first instance of RLC of the UE, and an RLC of a first BS (e.g., a master node (MN), master cell group (MCG), or primary cell (PCell)). A second path may include the PDCP layer of the UE, a second instance of RLC of the UE, and an RLC of a second BS (e.g., a secondary node (SN), secondary cell group (SCG), or secondary cell (SCG)). The first and second BS may or may not be co-located. A non-duplicated transmission may use either the first or second path. A duplicated transmission may use both paths. For example, one bearer may be duplicated over both paths. A second bearer may be a split bearer (e.g., using multiple paths and/or multiple base stations for different portions of the traffic of the split bearer).

In some embodiments, the NW (e.g., the BS 102 and/or other NW element) may provide one or more configurations or parameters (e.g., duplication parameters) to the UE 106. For example, the parameters may configure the UE to use an indicated duplication mode, e.g., full duplication, non-duplication, autonomous duplication, partial duplication, or grant-based duplication. The parameters may further specify details related to an indicated mode.

For example, an autonomous duplication mode may refer to the UE 106 autonomously (e.g., independently, e.g., without receiving instructions based on duplication determinations made by the NW) making duplication determinations. Associated with an autonomous duplication mode, the NW may provide parameters for duplication activation and/or deactivation, e.g., for the UE to use in autonomous duplication determinations. Further, the NW may provide parameters for selecting the first or second path. For example, the NW may provide any number of measurement thresholds for activating/deactivating duplication and/or selecting the first or second path.

A partial duplication mode may be an example of an autonomous duplication mode. In turn, packet duplication and flow duplication may be examples of partial duplication. For a partial duplication mode (e.g., where some, but not all, transmissions are duplicated), the NW may provide parameters for one or more special or priority transmission types. For example, in a packet duplication mode, the NW may configure or predefine any number of special QFIs, e.g., for duplication in contrast to packets of other QFIs which may not be duplicated. Similarly, the NW may configure or predefine any number of special packet (e.g., or transport block, etc.) types, e.g., for duplication while other packet (e.g., transport block) types are not duplicated. Another example of a partial duplication made may include flow duplication, e.g., packets of one or more flows may be duplicated while packets of one or more other flows may not be duplicated.

In some embodiments, the UE 106 may provide one or more indications of duplication preferences to the NW. For example, the UE 106 may indicate any bearers, QFIs, packet types that it prefers to be duplicated (and/or prefers not to be duplicated) for UL and/or DL transmission.

Full duplication mode may refer to duplicating all transmissions. Conversely, non-duplication may refer to not duplicating any transmissions. Grant-based duplication, discussed more fully with respect to FIGS. 24-26 below, may refer to duplication of some transmissions, e.g., as indicated in corresponding resource grants.

The UE and BS may exchange application and/or control data in the uplink and/or downlink directions. The communication may occur on any frequency or combination of frequencies, e.g., including licensed and/or unlicensed spectrum. The communication may occur on any combination of the paths. The communication may continue (e.g., periodically, randomly, as needed, etc.) for any amount of time.

The UE 106 and/or BS 102 (or multiple BSs 102) may perform measurements of the paths (804), e.g., of radio link conditions on one or both paths. The measurements may include any radio link measurements such as signal-noise ratio (SNR), signal to interference and noise ratio (SINR), reference signal received power (RSRP), reference signal received quality (RSRQ), received signal strength indicator (RSSI), channel quality indicator (CQI), channel state information (CSI), block error rate (BLER), bit error rate (BER), etc. The measurements may occur over any number of subframes and/or symbols. The UE and/or BS may retain a history of measurement values. The UE/BS may compare the measurement values, or metrics calculated based on the measured values, to one or more thresholds. The UE/BS may use various parameters, e.g., for hysteresis, in such comparisons. The measurements, thresholds, and/or parameters may be configured by the BS (e.g., by the network) and/or by the UE. The UE and/or BS may report measurement values, comparison results, etc. to each other and/or to the network at any time.

In some embodiments, the UE 106 may periodically perform measurements and provide periodic and/or event triggered reports to the NW. For example, the UE 106 may take measurements and/or send reports according to a schedule or in response to preconfigured events/conditions.

In some embodiments, the UE 106 may perform measurements of RSRP and BLER of both the first and the second paths. The UE 106 may compare these measurements to various thresholds. The thresholds may be configured by the network and/or by the UE.

In some embodiments, one BS 102 may share or report a measurement (e.g., taken by that BS or reported by the UE) with one or more other BS 102s.

In some embodiments, the UE 106 may detect an RLC failure, e.g., an RLC failure may be an aspect of the radio link conditions determined in 804.

The UE 106 may determine QoS (e.g., 5QI, etc.) for an uplink transmission (806), e.g., or determine respective QoSs for respective portions of a transmission. For example, the UE 106 may determine QoS of an individual packet or a group of packets (e.g., the UE 106 may determine respective QoSs for respective packets). The UE 106 may determine QoS for a flow, e.g., the UE 106 may determine QFIs for any number of flows.

The UE 106 may dynamically determine duplication (808), according to some embodiments. For example, the UE 106 may determine one or more paths to use for the uplink transmission. For example, the UE 106 may select a path or paths when duplication should be enabled. Similarly, the UE 106 may select a path when (e.g., temporarily) disabling duplication and beginning to use a single path or flow. Further, the UE 106 may determine to switch from one path (or group of paths) to another path (or group of paths). In other words, the UE 106 may select one or more path to use which may be the same, overlap with, or be distinct from one or more paths used previously. The determination may be based on any combination of parameters, measurements, and QoS. The determination may also be based on other factors as desired.

In some embodiments, the UE 106 may autonomously activate or deactivate duplication (e.g., for one or more bearers or flows) or transfer bearers or flows from one path to another based on detection of activation, deactivation, or transfer conditions. For example, the UE 106 may activate or deactivate duplication or perform a transfer based on comparison of one or more measurements to one or more thresholds. Illustrative conditions are illustrated and described below with respect to FIGS. 14 and 15.

In some embodiments, the UE 106 may activate and/or deactivate duplication and/or perform transfers in connection with a handover (HO) event, e.g., in a DC situation. Duplication associated with HO may improve reliability and/or avoid or reduce delays of transmissions during HO, e.g., by maintaining continuity in UL transmissions. In other words, duplication during HO may avoid delays associated with switching cells (e.g., transmission paths). For example (e.g., in a DC based HO), before the HO, a bearer or flow may be configured with a single path, e.g., it may not be configured for packet duplication or may be a split bearer. The bearer may only be connected to an NR base station, e.g., a gNB. Based on the HO, the bearer or flow of the UE 106 may be configured with two paths (e.g., one path to the source PCell and a second path to the target PCell). In response to receiving an HO command, the UE 106 may enable UL duplication of packets of the bearer/flow on the two paths, e.g., to transmit to both the source and target PCells. The duplication of the packets may improve reliability of the UL data transfer by compensating for packet loss, e.g., which may typically occur during HO. In response to a successful HO, the UE 106 may deactivate duplication (e.g., and stop transmitting to the source PCell and continue transmission to the target PCell). In response to an HO failure, the UE 106 may discontinue transmission to the target PCell and may maintain (e.g., continue) transmitting to the source PCell. For a conditional HO, the UE 106 may establish a split bearer architecture (e.g., using paths to both cells) during HO. The UE 106 may perform duplication of UL transmissions during a conditional HO, and may release the source connection following a successful conditional HO.

In some embodiments, the UE 106 may operate in a partial duplication mode (e.g., flow or packet duplication modes) and may identify one or more packet types, QFIs, or flows for duplication. In other words, the UE 106 may select some packets and/or flows for duplication, e.g., based at least in part on QoS. For example, the UE 106 may select certain packets or flows and apply a duplication indication.

For example (e.g., in a flow duplication mode), all packets of flows with certain QFIs (e.g., special QFIs as configured by NW or predefined) may be duplicated.

Note that (e.g., in a packet duplication mode), within a single QFI, different types of packets may be evaluated differently. For example, transmission control protocol (TCP) data packets may not be identified for duplication, but TCP control packets may be identified for duplication. All packets of some types may be identified for duplication (or non-duplication), e.g., for certain QFIs or without regard to QFI. Some packet types may be duplicated for some QFIs, but not for other QFIs.

In some embodiments, the UE 106 may determine one or more packet types, QFIs, or flows that are duplicated in downlink (DL) transmissions from the NW. The UE 106 may identify UL packet types, QFIs, or flows for UL duplication based on such DL duplication. In other words, the UE 106 may reflect the NW's DL duplication determinations in the UE's UL duplication determinations. For example, in response to detecting the NW activating or deactivating duplication for a first QFI on DL, the UE correspondingly activate or deactivate duplication for the first QFI on UL.

In some embodiments, upper layers of the UE 106 may directly determine which packets or flows to duplicate. The decision to duplicate may be based on the application and/or other characteristics of data that is carried in the packets or flows, among various possibilities. For example, an application layer of the UE 106 may determine to duplicate specific packets or flows for UL transmission and not to duplicate others. The UE 106 may change such a determination as desired, e.g., in response to changing application/user activity on the device, changing radio link conditions (e.g., measurements), changing levels of network congestion, changing location, battery level, etc.

In some embodiments, duplication determinations may be based at least in part on indications in (or otherwise associated with) UL grants from the NW. For example, a UL grant may include a duplication indication. The UL grant may specify the duplicated cells (e.g., paths) and/or the paths may be configured in advance (e.g., via RRC in 802). Specification of the cells/paths in the UL grant may maintain flexibility. Configuration in advance may reduce overhead and achieve lower duplication signaling latency, e.g., at the time of the grant.

In response to a UL grant with a duplication indication, the UE 106 may generate a MAC protocol data unit (PDU) and duplicate it on the paths. The UL grant may be applied to the paths concurrently (e.g., based on the grant) or sequentially (e.g., a first path may be used first, and a second path may be indicated and used separately/later).

In some embodiments, different bearers may be handled differently for purposes of duplication, e.g., different bearers may have different duplication modes. Such modes may be configured by the NW and/or determined by the UE. For example, a first bearer may be duplicated, e.g., all packets and flows on the bearer may be duplicated. A second bearer may be duplicated partially, e.g., some packets or flows may be duplicated (e.g., based on QoS), but others may not be duplicated. A third bearer may not be duplicated at all. Note that other combinations of duplication for bearers are possible and may be used as desired.

In some embodiments, the NW may configure the duplication mode of a bearer (e.g., during RRC connection setup, e.g., in 802). For example, the NW may configure a bearer in a partial duplication mode, using a specific combination of paths (e.g., a common PDCP instance and two RLC instances). Such a configuration may be based on QoS profile of the bearer. For example, the NW may indicate that a first QFI may be duplicated on the bearer and a second QFI may not be duplicated, e.g., the first partial duplication mode may be QFI #1 duplication. In some cases, the UE 106 may indicate a preference for a duplication mode of the bearer, and the NW may configure (or reconfigure) the bearer as a result. For example, a bearer may initially be configured with a first QFI to be duplicated. The UE 106 may indicate a preference for the bearer to operate in a packet duplication mode (e.g., in which a subset of packets are duplicated based on packet type), and the bearer may be reconfigured by the network in response.

In some embodiments, the UE 106 may adjust duplication determinations over time. For example, the UE 106 may adjust which QFIs, packet types, or bearers are duplicated in response to factors such as activity of the UE or user, battery level, measurements, user settings, network settings, conditions, indications of past (e.g., recent) transmission success (e.g., frequency of retransmissions), etc.

In some embodiments, the UE 106 may autonomously activate a bearer in response to RLC failure on another bearer.

In further embodiments, rather than the UE 106 electing bearer duplication, such functionality may be performed by the NW (e.g., automatically, with or without requests from the UE), and appropriately signaled to the UE (for example, via DCI).

In some embodiments, the UE 106 may indicate a preference to the NW (e.g., BS 102) for DL duplication modes or parameters. In other words, the dynamic determination may include determining such preferred DL parameters and transmitting an indication of such preferences to the NW.

The UE 106 may perform one or more transmissions to the NW (810). The transmissions may use one or more paths, e.g., transmissions may or may not be duplicated according to the duplication determination. In some embodiments, the transmissions may use duplication parameters as indicated by the NW, e.g., which may or may not correspond to parameters indicated/preferred by the UE. The transmissions may be sent to one or more cells.

Figure 9:
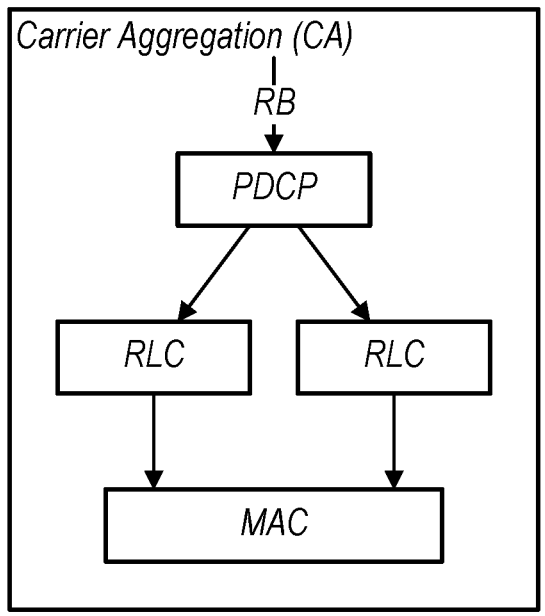
FIGS. 9 and 10 illustrate exemplary duplication in various contexts, according to some embodiments.
Figure 10:
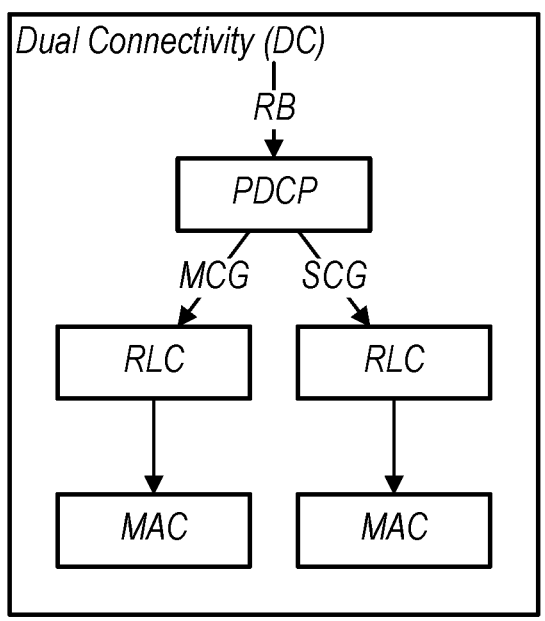

FIGS. 9 and 10—Duplication Examples

FIG. 9 illustrates (e.g., PDCP) duplication in context of CA, according to some embodiments. A radio bearer (RB) (e.g., SRB or DRB) may reach the PDCP layer (e.g., of UE 106) from an upper layer. In response to a determination that a transmission of the bearer (e.g., and/or a flow, packet, etc.) is to be duplicated, the PDCP layer may provide copies of the transmission to two instances of the RLC layer. Both instances of the RLC may be associated with the same RAT. Each instance of the RLC layer may provide its respective copy to the (e.g., common) MAC layer for further handling and transmission. For example, a first copy may be transmitted on a first path to a first cell and a second copy may be transmitted on a second path to a second cell.

FIG. 10 illustrates (e.g., PDCP) duplication in context of DC, according to some embodiments. A radio bearer (RB) (e.g., SRB or DRB) reaches the PDCP layer (e.g., of UE 106) from an upper layer. In response to a determination that a transmission of the bearer (e.g., and/or a flow, packet, etc.) is to be duplicated, the PDCP layer may provide copies of the transmission to two instances of the RLC layer. A first instance of the RLC may be associated with an MCG, e.g., using a first RAT. A second instance of the RLC may be associated with an SCG, e.g., using a second RAT. The second RAT may be the same or different from the first RAT. Each instance of the RLC layer may provide its respective copy to its respective (e.g., separate) instance of the MAC layer for further handling and transmission. For example, a first copy may be transmitted on a first path to the MCG and a second copy may be transmitted on a second path to the SCG.

Figure 11:
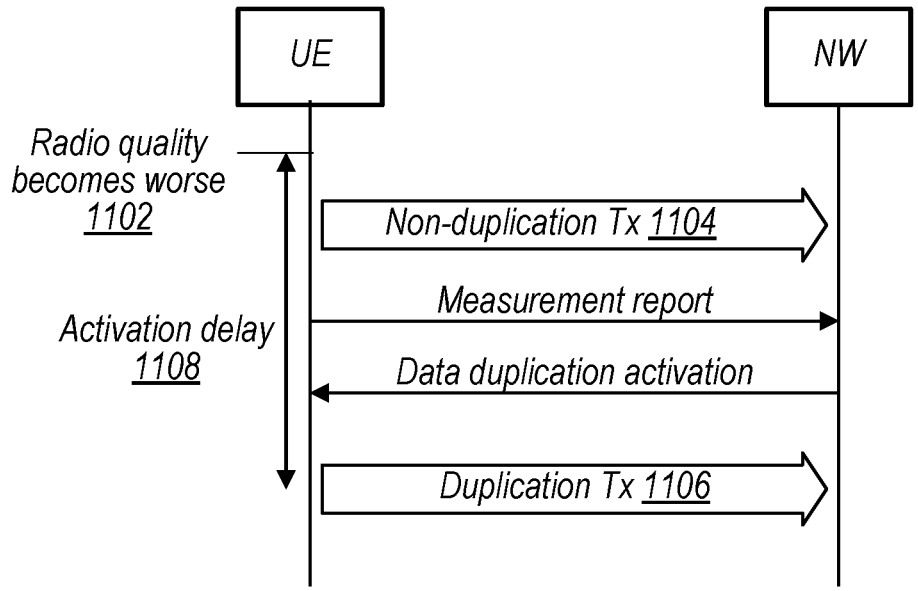
FIGS. 11 and 12 are communication flow diagrams illustrating a delay in duplication activation or deactivation, according to some embodiments.
Figure 12:
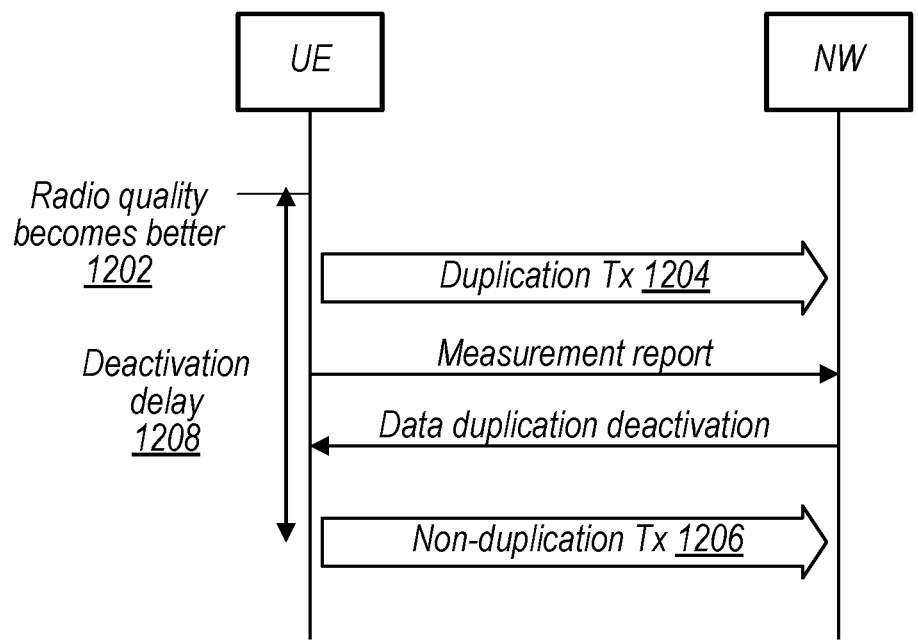

FIGS. 11 and 12—Delay

FIG. 11 is a communication flow diagram illustrating a delay in duplication activation, according to some embodiments. Radio conditions may deteriorate at a first time (1102), e.g., conditions may get worse to the point of falling below one or more thresholds of quality for activating duplication. The UE 106 may transmit any number of non-duplicated transmissions to a NW (e.g., BS 102) (1104). The UE 106 may perform measurements and may transmit a measurement report to the NW. In response to the measurement report, the NW may determine to activate duplication for the UE 106 and the BS 102 may transmit an indication of duplication activation. In response to receiving the duplication activation, the UE 106 may proceed to duplicate one or more transmissions to the NW (1106), e.g., using paths to one or more BSs 102. The activation delay 1108 may be the time between the deterioration of radio conditions 1102 and the first duplicated transmission 1106. The benefits of duplication (e.g., transmission quality/reliability improvement) may not be realized during the activation delay. In other words, during the delay there may be a transmission quality problem.

FIG. 12 is a communication flow diagram illustrating a delay in duplication deactivation, according to some embodiments. Radio conditions may improve at a first time (1202), e.g., conditions may get better to the point of exceeding one or more thresholds of quality for deactivating duplication. The UE 106 may transmit any number of duplicated transmissions to a NW (e.g., using paths to one or more BSs 102) (1204). The UE 106 may perform measurements and may transmit a measurement report to the NW. In response to the measurement report, the NW may determine to deactivate duplication for the UE and the BS may transmit an indication of duplication deactivation. In response to receiving the duplication deactivation, the UE 106 may proceed to cease duplication and transmit one or more (e.g., non-duplicated) transmissions to the NW (1206). If one path is a default path, the UE 106 may cease using the other path. Alternatively, the duplication deactivation may specify which path to deactivate. The deactivation delay 1208 may be the time between the improvement of radio conditions 1202 and the first non-duplicated transmission 1206. During the deactivation delay, additional resources (e.g., time/frequency resources, transmission power) may be used for duplication, e.g., likely without significant benefit to transmission reliability. In other words, during the delay there may be a resource efficiency problem.

Figure 13:
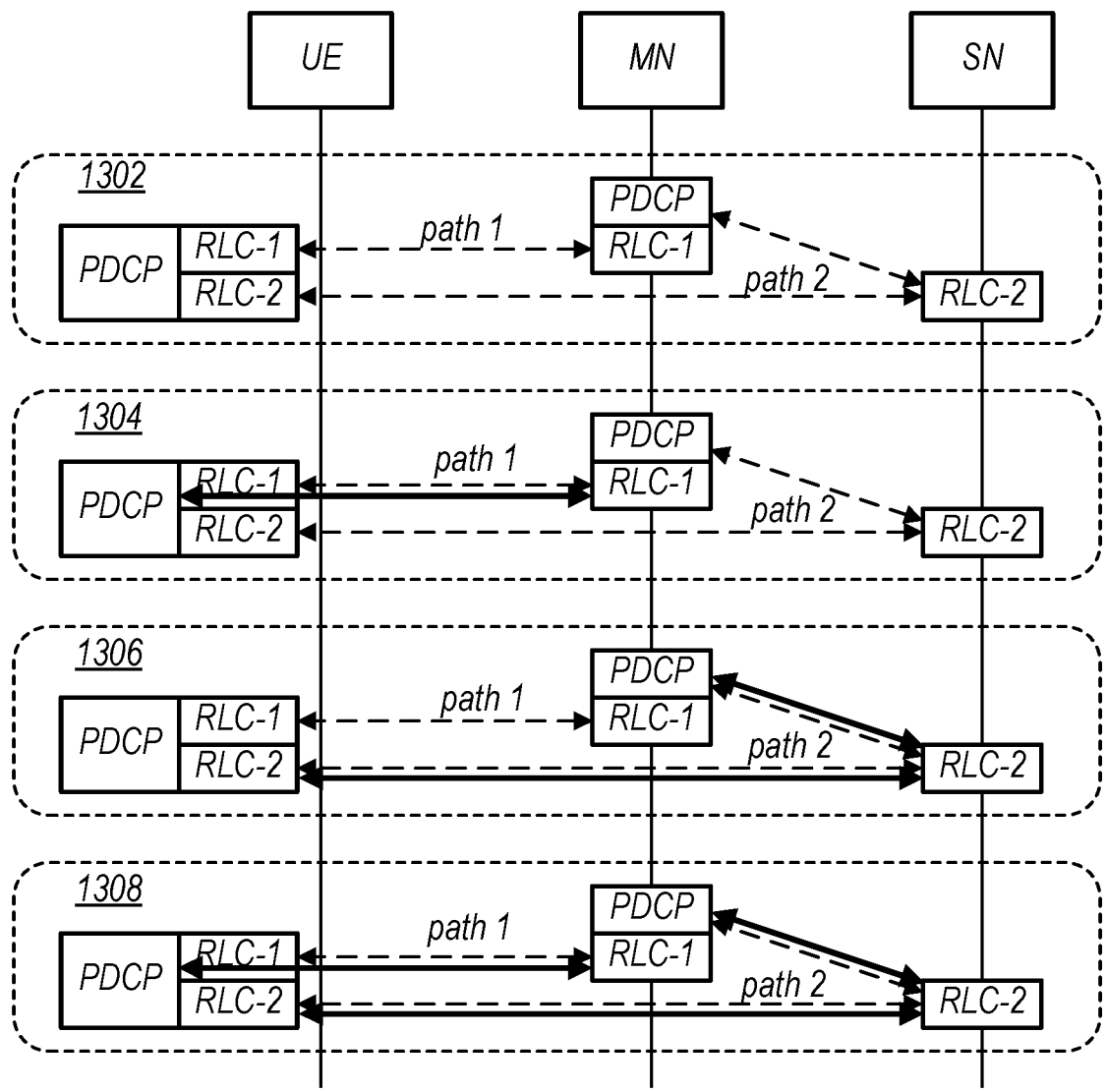
FIG. 13 is a communication flow diagram illustrating various paths between a UE and a NW, according to some embodiments.

FIG. 13—Path Selection

FIG. 13 is a communication flow diagram illustrating various paths between a UE and a NW, according to some embodiments. Block 1302 illustrates two paths (e.g., 1 and 2) between UE 106 and a network. As illustrated, path 1 connects RLC-1 of the UE 106 with an RLC-1 of a master node (MN), and path 2 connects RLC-2 of the UE 106 with an RLC-2 of a secondary node (SN). The MN and SN may operate according to the same or different RATs. The MN and SN may be provided by the same or different BSs (e.g., BS 102), e.g., in the same or different locations. For example, in the case of a multi-RAT BS, the MN and SN may be different logical entities within the BS. Block 1304 illustrates a first case in which the UE 106 may exchange data with the network via path 1, e.g., the PDCP of the UE is connected through RLC-1 of the UE 106 and RLC-1 of the MN to the PDCP of the MN. In this case, transmissions may not be duplicated. Block 1306 illustrates a second case in which the UE 106 exchanges data with the network via path 2, e.g., the PDCP of the UE is connected through RLC-2 of the UE 106 and RLC-2 of the SN to the PDCP of the MN. In this case, transmissions may not be duplicated. Block 1308 illustrates a third case in which the UE 106 exchanges data with the network via paths 1 and 2. In this case, transmissions may be duplicated over both paths, e.g., via RLC-1 and RLC-2.

Figure 14:
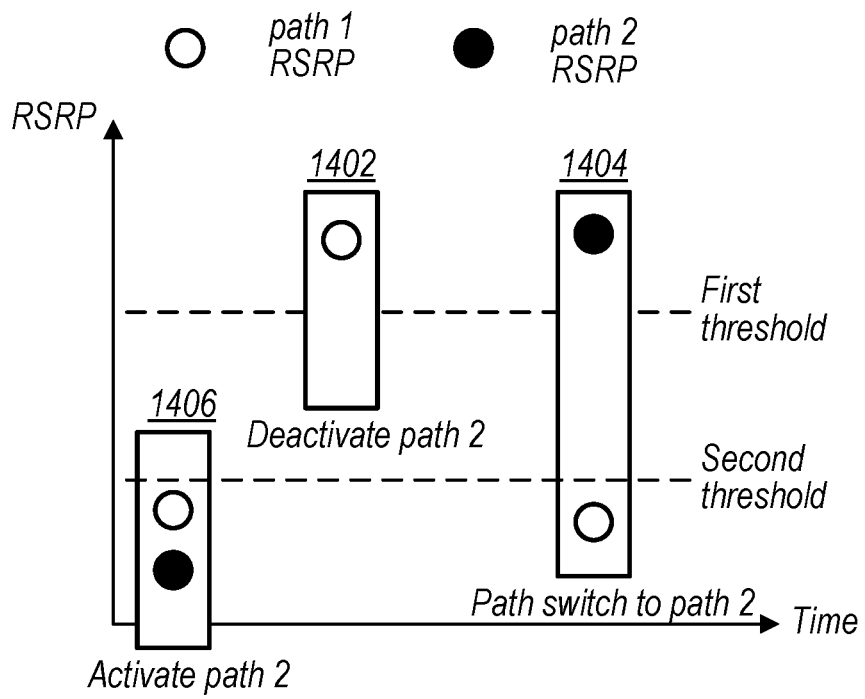
FIGS. 14 and 15 are block diagrams illustrating exemplary conditions for duplication activation/deactivation and/or transfer of transmissions between paths, according to some embodiments.
Figure 15:
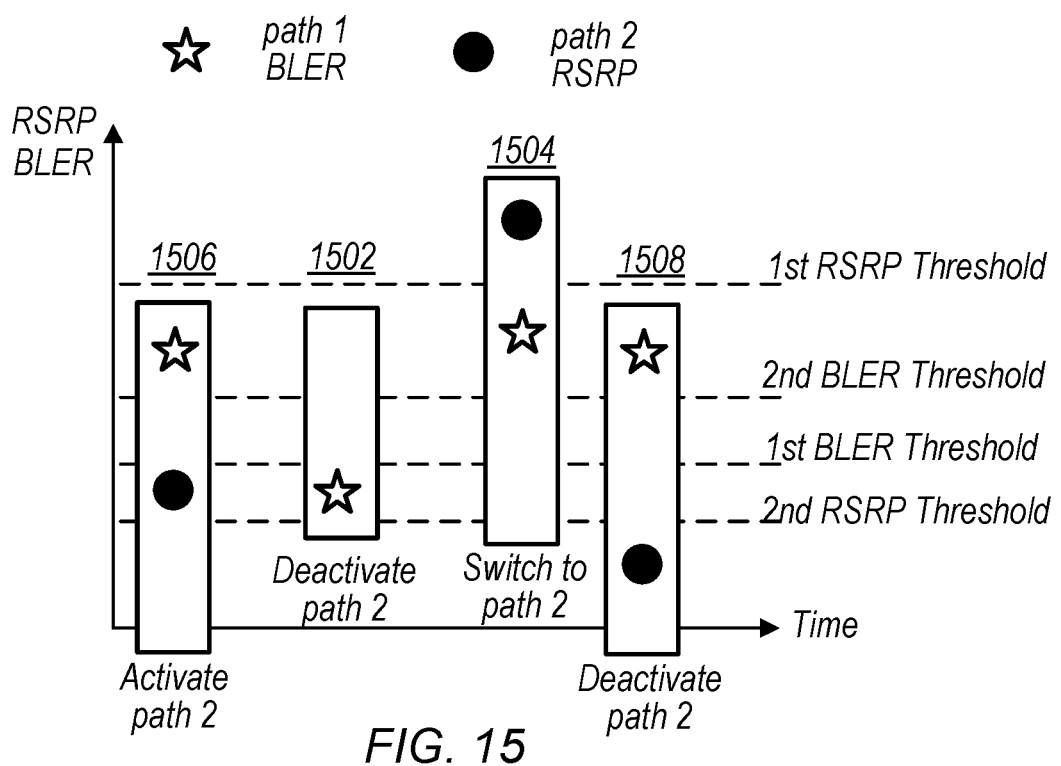

FIGS. 14 and 15—Autonomous Activation, Deactivation, and Transfer Conditions

FIGS. 14 and 15 are block diagrams illustrating exemplary conditions for duplication activation/deactivation and/or transfer of transmissions between paths, according to some embodiments. In other words, these figures illustrate conditions that may be used by a UE 106 operating in an autonomous duplication mode to dynamically determine whether to duplicate transmissions. The conditions may be predefined and/or modified over time by the network. Note that the illustrated conditions are examples only and that other conditions or combinations of conditions may be used, substituted, etc., as desired. The illustrated conditions may be considered in combination with the paths illustrated in FIG. 13, however other combinations of paths and conditions may be used, as desired.

In some embodiments, the NW may configure the UE 106 to enter an autonomous duplication mode, e.g., by transmitting a duplication parameter to the UE 106 including an indication of an autonomous mode. In response to such a parameter, the UE 106 may begin to dynamically activate or deactivate duplication, e.g., based on conditions such as those illustrated in FIGS. 14 and 15.

FIG. 14 illustrates a first combination of conditions, e.g., using radio conditions as measured by RSRP. Use of path 1 for UL transmissions may be a default configuration, e.g., the UE 106 may initially operate using path 1 and may switch transmission modes in response to changing conditions.

In a first condition (1402), the RSRP of path 1 may be above a first threshold (e.g., a single path threshold). In such a condition, the UE 106 may determine to (e.g., continue to) use path 1. Further, the UE 106 may determine to deactivate path 2, if path 2 is currently active.

In a second condition (1404), the RSRP of path 2 may be above the first threshold and the RSRP of path 1 may be below a second threshold (e.g., a deactivation threshold). In such a condition, the UE 106 may determine to switch to path 2 (e.g., deactivate path 1 and activate path 2 thus selecting path 2 for UL). In other words, the switch may be a complete switch from path 1 to path 2. Note that path 2 may previously be active, in which case the UE 106 may deactivate path 1. For example, if duplication was previously active, the UE 106 may deactivate path 1 and use path 2.

In a third condition (1406), the RSRP of both paths 1 and 2 may be below the second threshold (e.g., a duplication threshold). In such a condition, the UE 106 may determine to duplicate transmissions on paths 1 and 2. In other words, the UE 106 may activate path 2 (or path 1, in the event that path 2 is currently active).

Note that, although FIG. 14 is illustrated with two thresholds, additional or different thresholds may be used. For example, the duplication threshold of 1406 may be different than the deactivation threshold of 1404. Similarly, thresholds applied to path 1 may be the same or may be different from thresholds applied to path 2.

As a still further possibility, the duplication threshold of 1406 may be the same as the single path threshold of 1402. In other words, if the quality of one path exceeds the single path (e.g., duplication) threshold, that path may be used (e.g., and transmissions may not be duplicated). However, if neither path exceeds the single path threshold (e.g., both paths are below the duplication threshold), then transmissions may be duplicated and transmitted on both paths. In other words, duplication may be selected if both paths exhibit a medium or poor quality, but neither path exhibits a good or high quality.

FIG. 15 illustrates a second combination of conditions, e.g., using radio conditions as measured by RSRP and error rates (e.g., BLER). BLER may be measured at the RLC of the UE or at the RLC of the BS and reported to the UE. Use of path 1 for UL transmissions may be a default configuration, e.g., the UE 106 may initially operate using path 1 and may switch transmission modes in response to changing conditions.

In a first condition (1502), the BLER of path 1 may be below a first BLER threshold (e.g., a single path threshold). In such a condition, the UE 106 may determine to (e.g., continue to) use path 1. Further, the UE 106 may determine to deactivate path 2, if path 2 is currently active.

In a second condition (1504), the RSRP of path 2 may be above a first RSRP threshold (e.g., a non-default path threshold) and the BLER of path 1 may be above a second BLER threshold (e.g., a deactivation threshold). In such a condition, the UE 106 may determine to switch to path 2 (e.g., deactivate path 1 and activate path 2 thus selecting path 2 for UL). Note that path 2 may previously be active, in which case the UE 106 may deactivate path 1.

In a third condition (1506), the RSRP of path 2 may be above a second RSRP threshold (e.g., a minimum usability threshold) and/or the BLER of path 1 may be above the second BLER threshold. In such a condition, the UE 106 may determine to duplicate transmissions on paths 1 and 2. In other words, the UE 106 may activate path 2 (or path 1, in the event that path 2 is currently active).

In a fourth condition (1508), the RSRP of path 2 may be below the second RSRP threshold (e.g., the minimum usability threshold) and the BLER of path 1 may be above the second BLER threshold. In such a condition, neither path may offer a reliable path for UL transmission, e.g., conditions may be poor for both paths. Accordingly, the UE 106 may provide a measurement report to the network. Further, the UE (e.g., and/or the NW) may reconfigure one or both paths, and/or may activate one or more other paths, among various possibilities. Alternatively or additionally, notwithstanding the poor BLER of path 1, the UE 106 may determine to (e.g., continue to) use path 1, e.g., because the RSRP of path 2 is sufficiently low that further transmissions on path 2 are unlikely to improve transmission reliability. Further, the UE 106 may determine to deactivate path 2, if path 2 is currently active.

Note that, although FIG. 15 is illustrated with four thresholds, additional thresholds may be used. For example, the second BLER threshold of 1506 may be a duplication threshold and may be different than the deactivation threshold of 1504. Similarly, thresholds applied to path 1 may be the same or may be different from thresholds applied to path 2.

Application of thresholds similar to those illustrated in FIGS. 14 and 15 may speed up duplication activation/deactivation and/or path transfer. Accordingly, they may avoid unnecessary duplication transmission, improve resource efficiency, and/or improve reliability. Further, such conditions/thresholds may be used in combination with other conditions for duplication activation/deactivation and/or transfer between paths. For example, different thresholds may be applied for different flows or packets, e.g., based on QoS, QFI, packet type, etc. For example, when evaluating duplication of a higher QoS packet/flow, a UE 106 may apply more conservative thresholds (e.g., thus increasing the range of radio conditions in which duplication is applied) relative to the thresholds used for a lower QoS packet/flow. Further, different thresholds may be applied based on application type associated with the flows/packets. Similarly, thresholds may be adjusted or adapted by the UE and/or NW based on conditions, e.g., congestion, battery level, etc.

FIG. 16—5QI

FIG. 16 is a table illustrating QoS requirements as indicated by 5QI, according to some embodiments. As shown, different 5QI values may indicate various bit rates, delay budgets, error rates, data types, etc.

FIGS. 17 and 18—Aspects of Duplication

FIG. 17 is a communication flow diagram illustrating transmissions on a duplicated DRB from a UE 106 to a NW. As shown, a DRB may include two data streams, e.g., with different QFI levels: QFI #1 and QFI #2. In the illustrated example, the data of the flow with QFI #1 may be relatively important. Therefore, a high level of transmission reliability may be desired for the flow with QFI #1. The data of the flow with QFI #2 may be less important, and thus providing a high level of transmission reliability to the flow with QFI #2 may be a lower priority. As illustrated, if duplication decisions are made at the bearer level, both the flow with QFI #1 and the flow with QFI #2 may be duplicated during transmission. In contrast, according to the techniques disclosed herein (e.g., described above with respect FIG. 8), it may be possible to selectively duplicate the high priority flow (e.g., the flow with QFI #1).

FIG. 18 is another communication flow diagram illustrating transmissions on a duplicated DRB from a UE 106 to a NW. As shown, a DRB may include a single data stream, e.g., a flow with QFI #1. In the illustrated example, the second data packet 1802 of the flow may be relatively important. Therefore, a high level of transmission reliability may be desired for packet 1802. The data of the other packets may be less important, and thus providing a high level of transmission reliability to the other packets may be a lower priority. As illustrated, if duplication decisions are made at the bearer level or the flow level, all packets of the flow may be duplicated during transmission. In contrast, according to the techniques disclosed herein (e.g., described above with respect FIG. 8), it may be possible to selectively duplicate the high priority data (e.g., packet 1802).

FIGS. 19-23—Partial Duplication Mode

Figure 19:
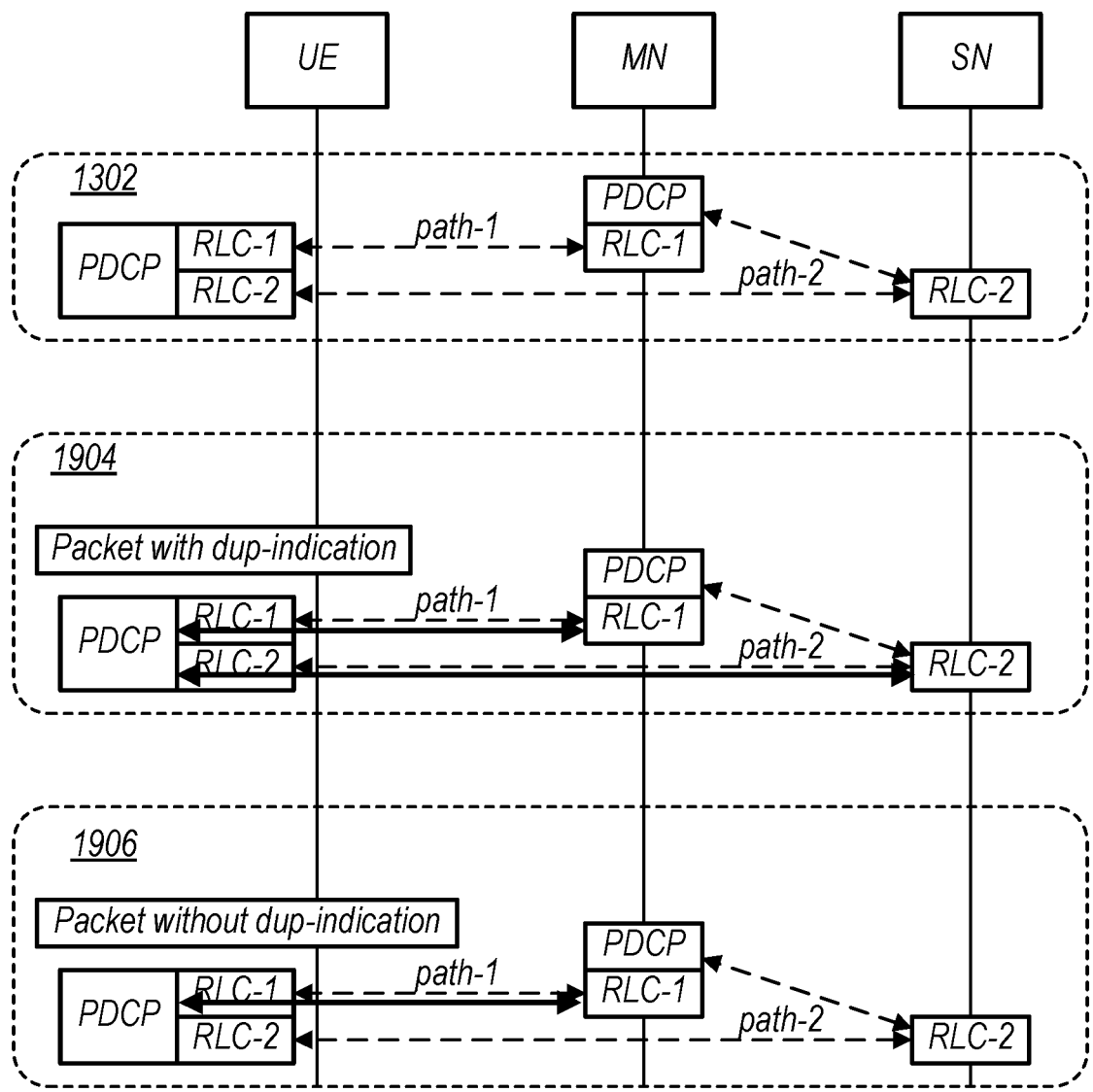
FIGS. 19-23 illustrate aspects of a partial duplication mode, according to some embodiments.

FIG. 19 is a communication flow diagram illustrating a partial duplication mode using various paths between a UE 106 and a NW, according to some embodiments. Partial duplication modes may be useful to provide more flexibility and nuance to duplication determinations. For example, in scenarios where bearers do not neatly correspond to QoS requirements, partial duplication modes may allow for duplication of some high reliability flows without duplication of lower reliability flows/packets. In other words, duplication may be applied only to packets/flows that warrant the higher level of reliability.

In some embodiments, the NW may configure the UE to enter a partial duplication mode, e.g., by transmitting a duplication parameter to the UE including an indication of a partial duplication mode.

FIG. 19 includes block 1302 which, illustrates two paths (e.g., 1 and 2) between UE 106 and a network as described above with respect to FIG. 13.

In block 1904, in response to detecting an indication for duplication of a packet, packet type, and/or a flow (e.g., including a packet), the UE 106 may duplicate a packet on paths 1 and 2. For example, in response to a duplication flag (e.g., duplication indication=yes), the PDCP of the UE 106 may process the packet in duplication mode, and may route the same PDCP PDU to both RLC entities (e.g., 1 and 2). For purposes of buffer status reporting (BSR) the UE 106 may report the data amount of a packet to be duplicated in buffer status reports for each path.

In block 1906, in response to a packet (e.g., and/or a flow including a packet) without a duplication indication, the UE 106 may transmit the packet on a primary (e.g., default or currently active) RLC entity or path (e.g., path 1) without duplication on a secondary/inactive RLC/path (e.g., path 2). For BSR reporting, the data amount of the packet may only be reported on/for the primary or active path. Note that the use of path 1 as primary or active path as opposed to path 2 is illustrative only; path 2 may be activated as desired, e.g., according to conditions as described with respect to FIGS. 14 and 15, among various possibilities.

In other words (e.g., while in a partial duplication mode), for packets of a single bearer (e.g., a single PDCP), the UE 106 may only duplicate packets with a duplication indication. Duplication indications may be applied to individual packets, groups of packets, categories of packets (e.g., packets of a certain type or containing certain content), packet/data flows (e.g., of one or more QFIs), and/or as identified by an upper layer of the UE.

The NW may select full, partial or non-duplication modes for a bearer based on various factors. For example, the NW may consider any combination of: QoS requirements of the bearer, UE preferences, availability of NW resources (e.g., congestion), radio link measurements, etc.

The NW may indicate the modes in one or more of various ways. For example, the NW may use a durable (e.g., lasts until changed, e.g., indefinite duration) configuration indication (e.g., RRC), the NW may transmit (e.g., temporary) duplication indications in downlink (DL) PDUs, and/or the NW may configure the UE to detect DL duplication (or non-duplication) (e.g., of a QFI) and to reflect that duplication (or non-duplication) in UL transmissions. The NW may further indicate various related parameters, e.g., including timing for duplication.

Figure 20:
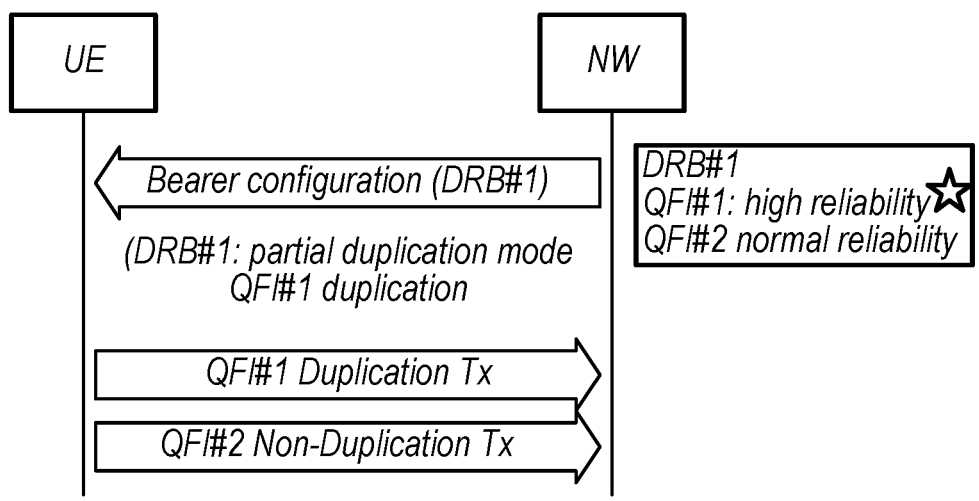

FIG. 20 is a communication flow diagram illustrating a partial duplication mode with a configuration based on QoS profile, according to some embodiments. The network may configure a bearer (e.g., DRB #1) via one or more configuration messages (e.g., via RRC) to the UE 106. The configuration may include various parameters. The configuration may establish two paths (e.g., as illustrated in 1302 and described with respect to FIG. 19. Further, the configuration may specify a partial (e.g., flow level) duplication mode for the bearer, e.g., based on a QoS profile. The configuration may further specify a QoS profile for duplication. In the illustrated example, the QoS profile may indicate that packets or flows with QFI #1 (e.g., which may be associated with high reliability) should be duplicated and that packets and/or flows with QFI #2 (e.g., normal reliability) should not be duplicated. Based on the configuration, the UE 106 may determine that flows of DRB #1 with QFI #1 should be duplicated and may transmit them on two paths (e.g., paths 1 and 2). In particular, the service data adaptation protocol (SDAP) mark all packets/data of flows with QFI #1 for duplication (e.g., duplication indication=yes) and may pass the packets on to lower layers for transmission. The UE 106 may also determine that packets/data of flows with QFI #2 should not be duplicated and may transmit them on a single path (e.g., path 1 or 2).

Figure 21:
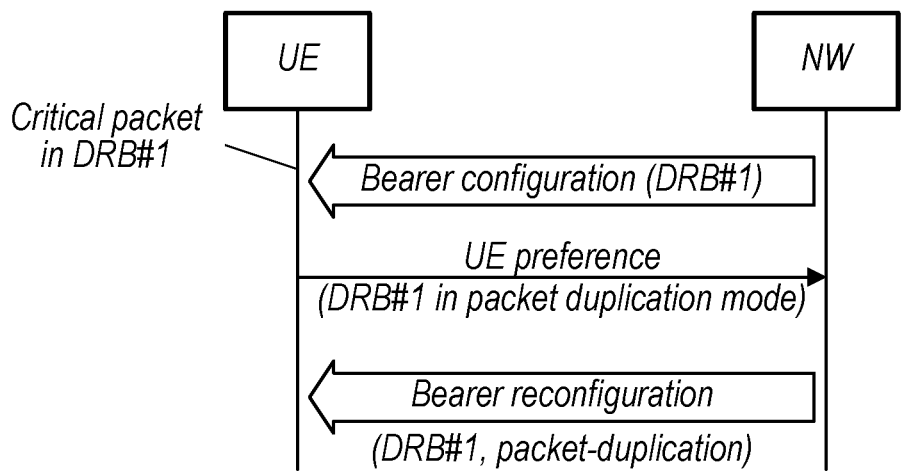

FIG. 21 is a communication flow diagram illustrating a partial duplication mode based in part on a UE preference, according to some embodiments. The network may configure a bearer (e.g., DRB #1) via one or more configuration messages (e.g., via RRC) to the UE 106. The configuration may include various parameters. The configuration may establish two paths (e.g., as illustrated in 1302 and described with respect to FIG. 19. Further, the configuration may specify a non-duplication mode for the bearer. The UE 106 may determine that one or more important (e.g., critical or high reliability) packet and/or flow is to be transmitted on the bearer. In response to the determination, the UE 106 may transmit a message indicating a preference that the bearer be reconfigured in a partial duplication mode. Based at least in part on the preference, the NW may reconfigure the bearer as a partial duplication mode bearer.

Figure 22:
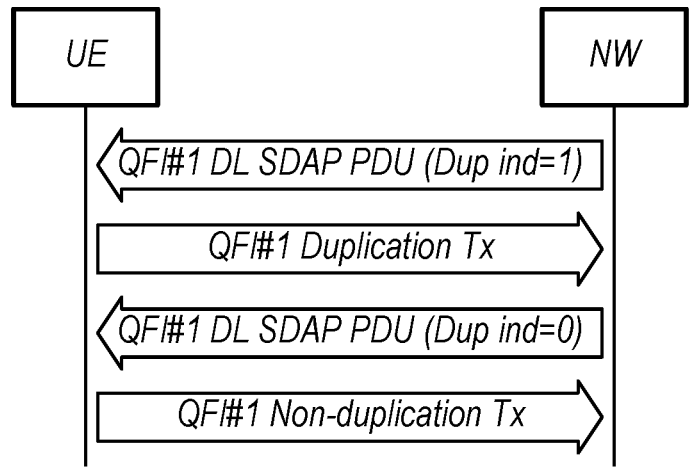

FIG. 22 is a communication flow diagram illustrating indication of duplication mode via DL packets. The NW may transmit a first DL SDAP PDU of a flow with QFI #1. The PDU may include an indication of duplication (e.g., duplication indication=1 or yes). In response, the UE 106 may transmit a first UL transmission (e.g., one or more SDAP PDUs) of a flow with QFI #1 in duplication mode (e.g., via paths 1 and 2). The NW may transmit a second DL SDAP PDU of a flow with QFI #1 and duplication indication=0 or no. In response, the UE 106 may transmit a second UL transmission (e.g., one or more SDAP PDUs) of a flow with QFI #1 in non-duplication mode (e.g., via a single path).

In the illustrated example, the duplication indication may configure the UE to use the indicated duplication mode for all UL packets of a flow with QFI #1 until a DL packet of a flow with QFI #1 is received with a different indication. However, it should be noted that, depending on parameters indicated by the NW, the UE 106 may respond differently to the duplication indication. For example, the UE 106 may apply the indicated duplication mode to packets of any configured or indicated subset of QFIs and/or packet types. The UE 106 may apply the indicated mode to a configured or indicated number of packets or for a configured or indicated time period (e.g., using a timer). A duplication indication of flows with one QFI may apply to flows with one or more other QFIs.

Figure 23:
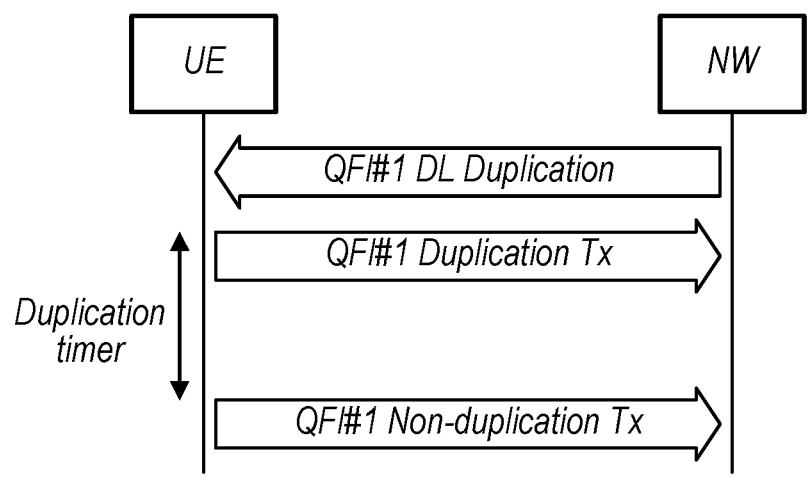

FIG. 23 is a communication flow diagram illustrating indication of duplication mode via detection and reflection of DL duplication modes. The NW may transmit one or more packets of a flow with QFI #1 using DL duplication (e.g., via two or more DL paths). The UE 106 may detect the DL duplication. In response to detecting the DL duplication, the UE 106 may reflect the duplication in the UL direction. For example, the UE 106 may initiate a timer and may duplicate all UL transmissions of a flow with QFI #1 until the timer expires. In response to expiration of the timer (e.g., without receiving a further DL transmission with duplication), the UE 106 may switch to non-duplication of additional UL transmissions. In some embodiments, each DL transmission may reset a timer. In some embodiments, each DL transmission may indicate a timer value and/or indicate whether the timer should be reset. In some embodiments, no timer may be used, e.g., and the reflected mode may be applied indefinitely or to a configured number of UL transmissions.

Figure 24:
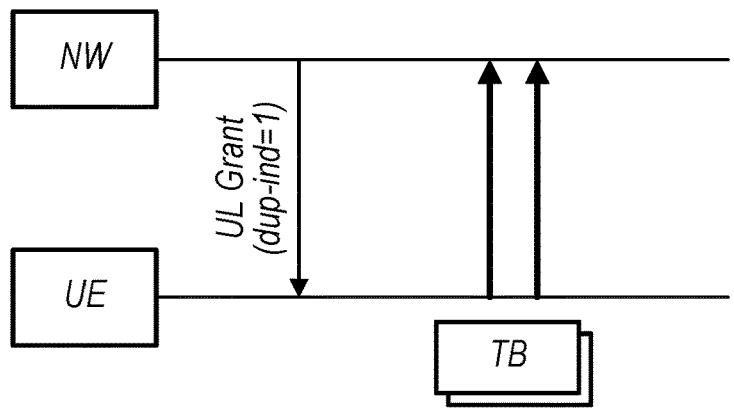
FIGS. 24-26 are communication flow diagrams illustrating grant-based duplication, according to some embodiments.
Figure 25:
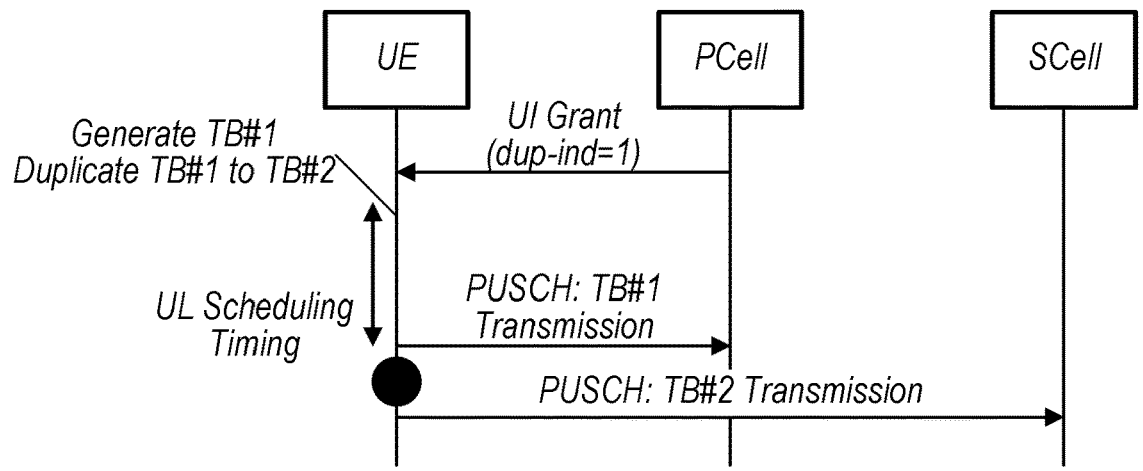
Figure 26:
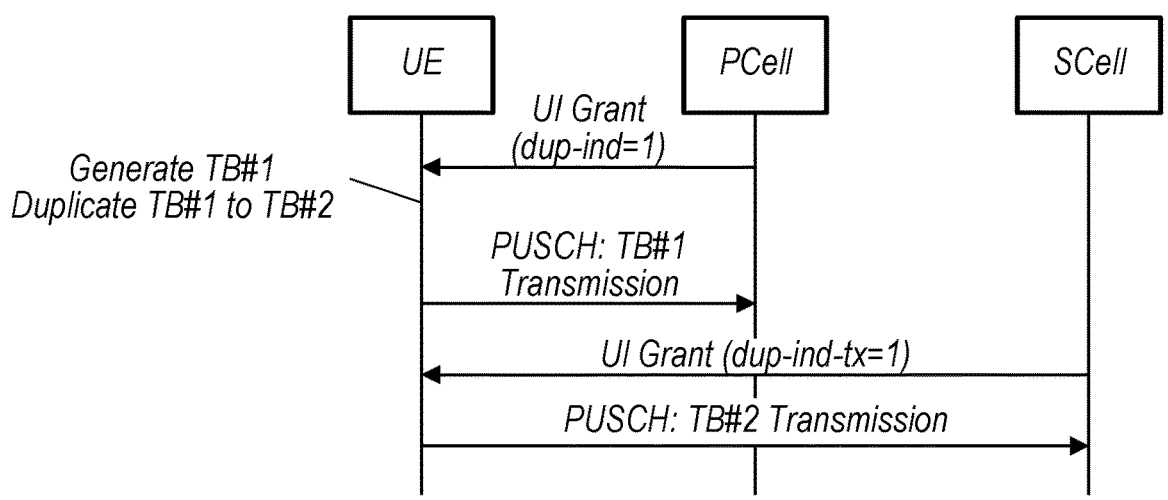

FIGS. 24-26—Grant-Based Duplication Mode

FIGS. 24-26 are communication flow diagrams illustrating grant-based duplication, according to some embodiments. Grant-based duplication may provide a further mechanism for dynamic scheduling of duplication. For example, grant-based duplication may allow the NW to rapidly respond to changes in UL radio quality. For example, the NW may determine whether to indicate duplication in a UL grant based on measurements performed by one or more BS 102 (e.g., of RSRP, BLER, etc.) of UL transmissions from the UE. The NW may further or alternatively consider measurements reported by the UE 106, congestion, or other factors. Thus, grant-based duplication may improve flexibility and nuance of duplication and improve radio resource efficiency.

In some embodiments, the NW may configure the UE 106 to enter a grant-based duplication mode, e.g., by transmitting a duplication parameter to the UE 106 including an indication of a grant-based mode. In response to such a parameter, the UE 106 may configure multiple paths (e.g., for UL transmissions) and may determine whether subsequent UL grant include a duplication indication (e.g., indicating duplication or non-duplication).

FIG. 24 is a communication flow diagram illustrating a duplicated transmission in response to a UL grant. A NW may send a UL grant to a UE 106. The UL grant may indicate duplication (e.g., duplication indication=1 or yes). In response to the grant and indication, the UE 106 may transmit a UL transmission (e.g., a packet, transport block (TB), etc.) using duplication. In other words, the UE 106 may generate the TB (e.g., a MAC PDU) and duplicate it on the duplicated cells/paths. For example, the UE 106 may transmit the TB on a default path (e.g., path 1) and on a second/duplicated path (e.g., path 2). As described previously, the first and second paths may be configured in advance, e.g., via RRC, or more flexibly. For example, the paths may be indicated by (configured with) the UL grant.

In various embodiments the UL grant may be applied on both cells in response to a single grant/indication or based on a separate indication.

FIG. 25 is a communication flow diagram illustrating a duplicated transmission in response to a UL grant. A NW may send a UL grant to a UE 106 via a PCell. In response to the grant, the UE 106 may generate a packet (e.g., a MAC PDU) as TB #1, and duplicate the packet as TB #2. The UE 106 may apply the UL grant on both the PCell and an SCell and may schedule transmissions of TB #1 and TB #2, e.g., without a further indication from the SCell. The TB #1 and TB #2 may be allocated to and scheduled on resources according to the UL grant. The TB #1 and TB #2 may be associated with the same transmission parameters (e.g., the same redundancy version (RV) and/or same HARQ ID). The UE 106 may perform transmissions of the TBs to the PCell and SCell according to the scheduled timing. The transmissions may be performed on physical uplink shared channel (PUSCH).

In some embodiments, duplication scheduling may only be applied on initial HARQ transmissions and may not be applied for re-transmissions. In some embodiments, retransmissions may be duplicated to the PCell and SCell, e.g., in response to a NACK received from either cell.

FIG. 26 is a communication flow diagram illustrating a separately duplicated transmission in response to a UL grant. A NW may send a UL grant to a UE via a PCell. In response to the grant, the UE 106 may generate a packet (e.g., a MAC PDU) as TB #1, and duplicate the packet as TB #2. The UE 106 may apply the UL grant on a first path to the PCell and transmit TB #1 (e.g., on PUSCH) to the PCell. The NW may send a second UL grant to trigger the transmission of TB #2 on the second path to the SCell. The second UL grant may indicate that the transmission should be duplicated to the SCell.

In the illustrated example, the second grant is transmitted from the SCell and indicates transmission of TB #2 to the SCell. However, the second grant may be transmitted from either cell and may indicate transmission to either cell. For example, the second grant may be transmitted from the PCell. The second grant may indicate transmission of the duplicated TB to the PCell.

In some embodiments, the second grant may be transmitted before the NW determines whether a first transmission (e.g., TB #1) has been received. In other embodiments, the second grant may be transmitted after the NW determines that TB #1 has not been received.

Figure 27:
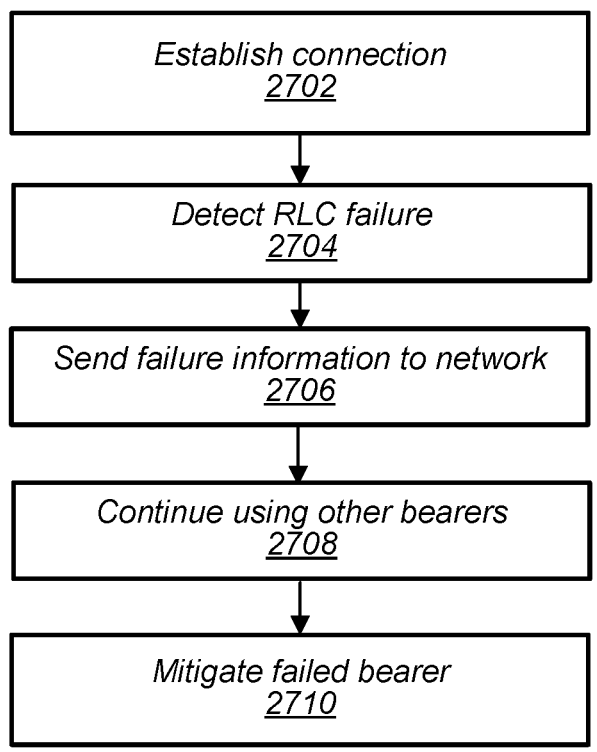
FIG. 27 is a flow chart illustrating exemplary techniques for RLC failure handling, according to some embodiments.

FIG. 27—Enhanced RLC Failure Handling Procedures

For an acknowledged mode (AM) RLC entity, an RLC failure may occur in the case that a transmission number of any PDU reaches a maximum transmission number. In other words, if the number of times that any PDU is re-transmitted (e.g., due to HARQ negative acknowledgements (NACKs)) reaches a threshold number, RLC failure may occur. Depending on the type of bearer where the RLC failure occurs, the failure may be handled differently.

RLC failure may cause a UE to declare radio link failure (RLF) if the RLC occurs on a non-duplicated MCG bearer or on a primary, duplicated MCG bearer. The UE 106 may suspend all data transmission (e.g., on all bearers and all cells) and may perform cell selection and/or connection reestablishment procedures. All data transmissions may be resumed after successful reestablishment of a connection (e.g., on the camped cell or a different cell). Thus, the RLC failure of a single bearer may lead to an interruption of UL and DL communications on all bearers.

RLC failure of a non-duplicated SCG bearer or a primary SCG duplicated bearer may trigger SCG-RLF and SCG failure procedure. The UE 106 may suspend SCG transmission for all bearers (e.g., bearers may remain active on MCG). The UE 106 may send SCG failure information to the NW via the MCG. SCG transmissions may be suspended until an RRC reconfiguration of the SCG is complete.

RLC failure of a secondary duplicated bearer (e.g., either MCG or SCG) may cause the UE to suspend transmissions on the associated RLC instance and send RLC failure information to the NW (e.g., using a primary bearer).

Thus, in some cases, RLC failure will impact transmissions on other bearers (e.g., in cases where RLC failure leads to RLF or SCG RLF). In other words, RLC failure on any non-duplicated bearer or the primary RLC entity of a duplicated bearer may lead to RLF or SCG RLF and a resulting interruption of other bearers.

Different bearers may have different RLC configurations and/or different QoS requirements. Therefore, RLC failure of one bearer may not indicate sufficient problems for the whole RRC link (e.g., including other bearers) to justify interrupting other bearers. In other words, it may be advantageous to avoid an RLC failure of one bearer causing an interruption for a second bearer. For example, if RLC failure occurs on a bearer (or RLC entity) with a relatively strict RLC configuration (e.g., a low maximum transmission number), it may be beneficial not to interrupt other bearers with less strict RLC configurations (e.g., higher maximum transmission number. For example, in the case of failure of an Ultra Reliable Low Latency Communication (URLLC) bearer with a maximum transmission number of 1, it may be advantageous not to interrupt an enhanced mobile broadband (eMBB) bearer with a maximum transmission number of 15.

FIG. 27 illustrates exemplary techniques for increasing flexibility and nuance in RLC failure handling. The illustrated techniques may reduce and/or eliminate interruptions on some bearers due to RLC failure on another bearer. For example, the techniques illustrated in FIG. 27 may handle failure of a URLLC RLC entity without impacting an eMBB data transmission. Aspects of the method of FIG. 27 may be implemented by a wireless device, such as the UEs 106, in communication with one or more base station (e.g., BS 102) as illustrated in and described with respect to the Figures, or more generally in conjunction with any of the computer systems or devices shown in the Figures, among other devices, as desired. For example, one or more processors or processing elements of a UE 106 (e.g., processor(s) 302, or one or more processors associated with circuitry 329 or 330 (e.g., processor(s) 512, 522, etc.)) and/or BS 102 (e.g., processor(s) 404, etc.) may be configured, respectively to cause UE 106 and/or BS 102 to perform any or all elements of the method of FIG. 27. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

A wireless device (e.g., UE 106) may establish a connection with a cellular network via a base station (e.g., BS 102) or multiple base stations (2702), according to some embodiments. Establishing the connection may include establishing an RRC connection.

In some embodiments, the connection may include one or more carriers using one or more RATs, e.g., the connection may include CA and/or DC. In some embodiments, the UE 106 may establish connections with multiple BSs, e.g., the connection may use an LTE BS (e.g., eNodeB) and an NR BS (e.g., gNb). Thus, the network (NW) may configure and the UE 106 may establish multiple transmission paths to the network.

For example, in PDCP level duplication, a first path may include a common PDCP layer of the UE, a first instance of RLC of the UE, and an RLC of a first BS (e.g., a master node (MN), master cell group (MCG), or primary cell (PCell)). A second path may include the PDCP layer of the UE, a second instance of RLC of the UE, and an RLC of a second BS (e.g., a secondary node (SN), secondary cell group (SCG), or secondary cell (SCG)). A non-duplicated transmission may use either the first or second path. A duplicated transmission may use both paths. For example, one bearer may be duplicated over both paths. A second bearer may be a split bearer (e.g., using multiple paths and/or multiple base stations for different portions of the traffic of the split bearer).

In some embodiments, duplication may occur (e.g., a duplication anchor may be located) above a Service Data Adaptation Protocol (SDAP) layer of the UE, e.g., the duplication may be session level duplication. In other words, data duplication may occur in an upper layer of the UE, and may proceed through (e.g., via separate paths) SDAP, PDCP, and RLC layers. The UE 106 may be aware of the PDU session pair for duplication transmissions.

In some embodiments, the NW (e.g., the BS 102 and/or other NW element) may provide one or more configurations or parameters to the UE 106. For example, the parameters may indicate RLC configurations for one or more bearers. Such RLC configurations may include maximum transmission numbers. Further, the parameters may indicate procedures for RLC failure handling.

The UE and the BS (or BSs) may communicate using one or more radio access technologies, e.g., NR. The UE and BS may exchange application and/or control data in the uplink and/or downlink directions. The communication and measurements may occur on any frequency or combination of frequencies, e.g., including licensed and/or unlicensed spectrum. The communication and measurements may continue (e.g., periodically, randomly, as needed, etc.) for any amount of time. For example, the communication and measurements may occur over any number of subframes and/or symbols. The measurements may include any radio link measurements The UE and/or BS may retain a history of measurement values. The UE/BS may compare the measurement values, or metrics calculated based on the measured values, to one or more thresholds. The UE/BS may use various parameters, e.g., for hysteresis, in such comparisons. The measurements, thresholds, and/or parameters may be configured by the BS (e.g., by the network) and/or by the UE. The UE and/or BS may report measurement values, comparison results, etc. to each other and/or to the network at any time.

The UE 106 may detect an RLC failure (2704), e.g., on a first bearer, according to some embodiments. The detection may be based on the transmission number of at least one PDU reaching a configured maximum transmission number of a bearer.

The UE 106 may send information about the RLC failure to the NW (2706), according to some embodiments. The failure information may be sent on another bearer. Notably, the UE 106 may not trigger RLF, SCG RLF, or reestablishment procedures. The UE 106 may suspend data transmission on the first bearer (e.g., the bearer with the RLC failure). In some embodiments, the UE 106 may also select one or more other bearers (e.g., with characteristics similar to the first bearer) and may also suspend data transmission on such bearers. The UE 106 may not suspend data transmissions on one or more second bearers.

The UE 106 may continue using other (e.g., second, non-suspended) configured bearers (2708), e.g., for UL and/or DL communications with the NW, according to some embodiments. In other words, the other (e.g., second, non-suspended) configured bearers may be used continuously (e.g., without interruption or suspension due to the RLC failure) before, during, and after the RLC failure. Note that, in this paragraph, continuous use does not necessarily indicate that data is constantly transmitted and/or received. Instead, continuous use refers to the bearer is never deactivated or suspended due to the RLC failure. In other words, intermittent activity of the bearer (e.g., due to scheduling, DRX, etc.) may be consistent with "continuous" use.

In some embodiments, in response to receiving the failure information, the NW and/or UE 106 may take various actions to mitigate the RLC failure (2710). For example, the NW may reconfigure one or more bearers (e.g., the bearer on which the RLC failure occurred). The NW may reconfigure the layer 1 (L1) or layer 2 (L2) configurations of the bearer(s). For example, the NW may modify an RLC configuration of the bearer(s), e.g., a maximum transmission number. The NW may transmit an indication of such a reconfiguration to the UE, and the UE 106 may implement the reconfiguration.

Similarly, the NW and/or the UE 106 may activate duplication of the bearer, e.g., on a different carrier. The UE 106 may (e.g., autonomously or in response to an indication from the NW) activate a previously deactivated bearer.

Further, the NW and/or the UE 106 may initiate a handover (HO). For example, the HO may transfer the failed bearer to a different cell. For example, if the failed bearer is an SCG bearer, the NW may initiate HO (via the MCG) to a different SCG or potentially to the MCG.

Note that the actions described with respect to blocks 2706, 2708, and 2710 may occur in any order and/or concurrently.

In some embodiments, the techniques of FIGS. 8 and 27 may be used in conjunction. For example, the techniques of FIGS. 8 and 27 may be used concurrently.

Figure 28:
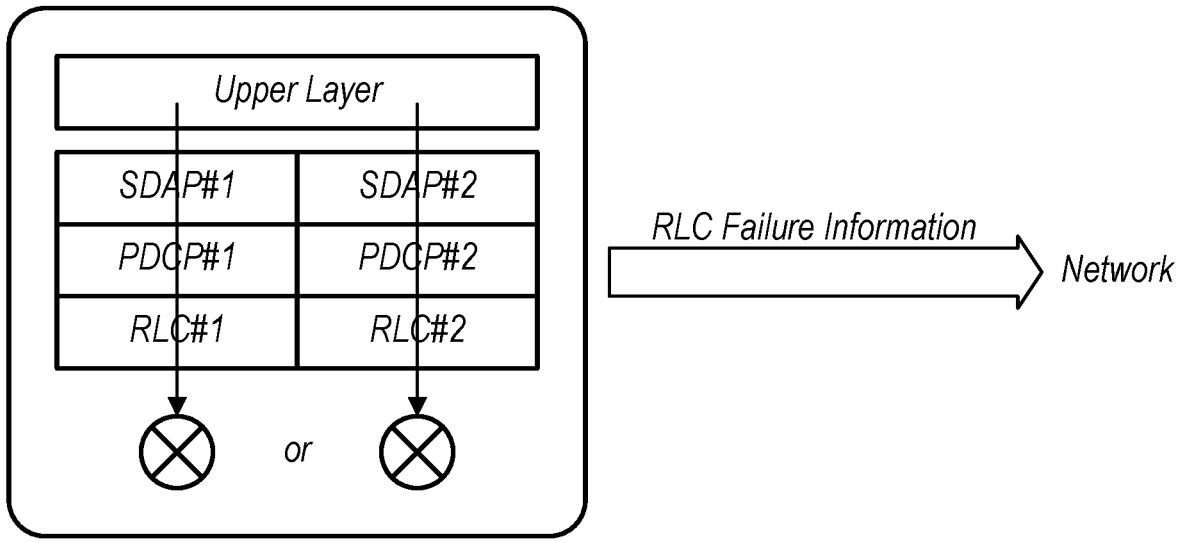
FIGS. 28-29 illustrate a UE informing a network of an RLC failure, according to some embodiments.
Figure 29:
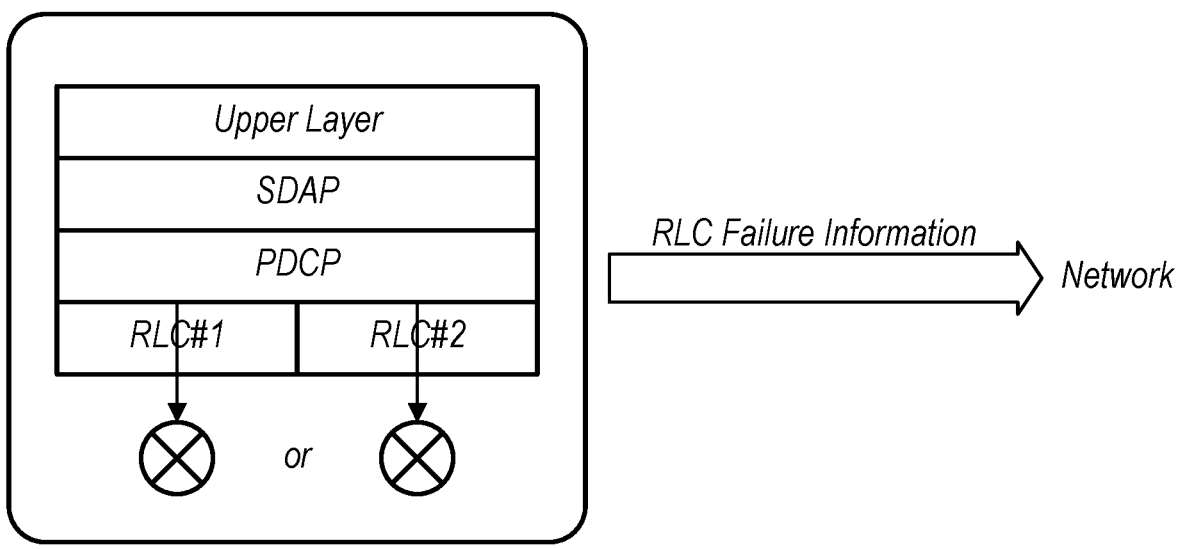

FIGS. 28-29—Enhanced RLC Failure Handling Examples

FIG. 28 illustrates a UE informing a network of an RLC failure in the context of PDU session level duplication, according to some embodiments. The duplication anchor may be above the SDAP layer, and duplicated transmissions may be handed from the upper layer, through separate SDAP and PDCP layer entities (e.g., #1 and #2), to separate RLC layer entities (#1 and #2). RLC failure may be detected by one of the RLC layer entities.

In response to an RLC failure of one PDU session (e.g., if the link quality of one of the PDU sessions is insufficient relative to an associated RLC configuration), the UE 106 may transmit RLC failure information to the NW. The UE 106 may not trigger RLF, SCG RLF, or reestablishment procedures. The UE 106 may continue to transmit data on the other PDU session.

FIG. 29 illustrates a UE informing a network of an RLC failure in the context of PDCP level duplication, according to some embodiments. The duplication anchor may be in the PDCP layer, and duplicated transmissions may be handed from the common PDCP layer to separate RLC layer entities (#1 and #2). RLC failure may be detected by one of the RLC layer entities.

In response to an RLC failure of one RLC link (e.g., if the quality of one link is insufficient relative to an associated RLC configuration), the UE 106 may transmit RLC failure information to the NW. The UE 106 may not trigger RLF, SCG RLF, or reestablishment procedures. The UE 106 may continue to transmit data on the other PDU session. If an additional RLC link (e.g., bearer) is configured but deactivated, the UE 106 may (e.g., autonomously or in response to an indication from the NW) active the additional RLC link.

Note that, although not illustrated in a separate figure, non-duplicated bearers may be handled similarly as illustrated in and described with respect to FIGS. 28 and 29. For example, in the event of an RLC failure, the UE 106 may report the failure information to the NW and may not trigger RLF or SCG RLF. The UE 106 may continue to use other bearers and/or may activate a configured but deactivated bearer.

Further Information and Examples

As described above, one aspect of the present technology is the gathering and use of data available from specific and legitimate sources to improve services to users. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users may selectively block the use of, or access to, personal information data. That is, the present disclosure contemplates that hardware and/or software elements can be provided to prevent or block access to such personal information data.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services In the following, exemplary embodiments are provided.

In one set of embodiments, an apparatus for managing transmissions of a user equipment device (UE) may comprise a processing element configured to cause the UE to: establish a connection with a base station, wherein the connection comprises a first path and a second path; receive, from the base station, at least one duplication parameter; dynamically determine, based at least in part on the at least one duplication parameter, whether to duplicate transmission of a first uplink transmission, wherein the dynamic determination is further based at least in part on one of: radio link conditions; a handover event; a service attribute; or an uplink grant received from the base station; and transmit the first uplink transmission on one or more of the first path or the second path in accordance with the dynamic determination.

In some embodiments, the processing element is further configured to cause the UE to: receive, from the base station, at least a first threshold; and perform measurements of radio link conditions, wherein to dynamically determine whether to duplicate transmission of the first uplink transmission comprises: comparing the measurements to the first threshold; and autonomously determining whether to duplicate transmission of the first uplink transmission based on the comparison.

In some embodiments, the measurements comprise measurements of reference signal received power and block error rate.

In some embodiments, the radio link conditions comprise a radio link control (RLC) failure.

In some embodiments, the dynamic determination is based at least in part on the handover event, wherein the dynamic determination comprises: during the handover event, duplicating transmission on both: a source PCell; and a target PCell.

In some embodiments, to dynamically determine whether to duplicate transmission based on the service attribute, the processing element is further configured to cause the UE to: determine a quality of service of the first uplink transmission, wherein the first uplink transmission comprises a first portion with a first quality of service and a second portion with a second quality of service; determine, based on the first quality of service to duplicate transmission of the first portion, wherein to duplicate transmission comprises transmitting the first portion on both the first path and the second path; and determine, based on the second quality of service not to duplicate transmission of the second portion.

In some embodiments, the processing element is further configured to cause the UE to: transmit, to the base station, an indication of a preferred duplication mode, wherein the preferred duplication mode comprises a partial duplication mode.

In some embodiments, the processing element is further configured to cause the UE to: initiate a timer in response to the dynamic determination.

In some embodiments, the processing element is further configured to cause the UE to: receive the uplink grant from the base station, wherein the uplink grant comprises a duplication indication, wherein the dynamic determination is based on the duplication indication.

In some embodiments, a method for managing transmissions of a user equipment device (UE), may comprise, at the UE: establishing a connection with a base station, wherein the connection comprises a first path and a second path; receiving, from the base station, at least one duplication parameter; dynamically determining, based at least in part on the at least one duplication parameter, whether to duplicate transmission of a first uplink transmission, wherein the dynamic determination is further based at least in part on one of: radio link conditions; a handover event; quality of service; or an uplink grant received from the base station; and transmitting the first uplink transmission on one or more of the first path or the second path in accordance with the dynamic determination.

In some embodiments, the method further comprises: receiving, from the base station, at least a first threshold; and performing measurements of radio link conditions, wherein to dynamically determine whether to duplicate transmission of the first uplink transmission comprises: comparing the measurements to the first threshold; and autonomously determining whether to duplicate transmission of the first uplink transmission based on the comparison.

In some embodiments, the method further comprises: receiving, from the base station, at least a second threshold; and comparing the measurements to the second threshold, wherein the measurements comprise a quality of the first path and a quality of the second path, wherein autonomously determining whether to duplicate transmission of the first uplink transmission based on the comparisons comprises: if the quality of the first path is better than the first threshold, transmitting the first uplink transmission via the first path; if the quality of the second path is better than the first threshold and the quality of the first path is worse than the second threshold, transmitting the first uplink transmission via the second path; and if the quality of the first path is worse than the first threshold and if the quality of the second path is worse than the first threshold, duplicate the transmission of the first uplink transmission, wherein to duplicate transmission comprises transmitting the first uplink transmission on both the first path and the second path.

In some embodiments, the method further comprises: receiving the uplink grant from the base station, wherein the uplink grant comprises a duplication indication, wherein the dynamic determination is based on the duplication indication.

In some embodiments, an apparatus for managing transmissions of a user equipment device (UE) may comprise a processing element configured to cause the UE to: establish a connection with a network, wherein the connection comprises at least a first bearer and a second bearer; receive a radio link control (RLC) parameter for the first bearer from the network; detect an RLC failure on the first bearer, wherein detecting the RLC failure is based at least in part on the RLC parameter; suspend transmission of data on the first bearer; send information about the RLC failure to the network; and transmit data to the network using the second bearer.

In some embodiments, the processing element is further configured to cause the UE to: mitigate the RLC failure.

In some embodiments, to mitigate the RLC failure, the processing element is further configured to cause the UE to: receive an indication, from the network, of a reconfiguration of the first bearer; and implement the reconfiguration of the first bearer.

In some embodiments, to mitigate the RLC failure, the processing element is further configured to cause the UE to: autonomously activate a third bearer.

In some embodiments, to mitigate the RLC failure, the processing element is further configured to cause the UE to: perform a handover.

In some embodiments, the first bearer is a non-duplicated bearer.

In some embodiments, the second bearer is continuously used for transmitting data to the network: prior to the RLC failure; during the RLC failure; and after the RLC failure.

Another exemplary embodiment may include a wireless device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Yet another exemplary set of embodiments may include a 5G NR network node or base station configured to perform any action or combination of actions as substantially described herein in the Detailed Description and/or Figures.

Yet another exemplary set of embodiments may include a 5G NR network node or base station that includes any component or combination of components as described herein in the Detailed Description and/or Figures as included in a mobile device.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus for managing transmissions of a user equipment device (UE), the apparatus including:
a processor configured to cause the UE to:
establish a connection with a cellular network, wherein the connection includes:
a first path between the UE and the cellular network; and
a second path between the UE and the cellular network;
receive, from the cellular network, a first duplication parameter including an indication to autonomously determine duplication;
autonomously determine, in response to the indication, whether to duplicate transmission of first uplink data;
duplicate a first portion of the first uplink data on both of the first path and the second path in accordance with the determination; and
transmit a second portion of the first uplink data on only the first path in accordance with the determination.

2. The apparatus of claim 1, wherein the processor is further configured to cause the UE to perform a first handover event, wherein the determination is based at least in part on the first handover event, wherein the first portion of the first uplink data includes a portion of the first uplink data transmitted during the first handover event, wherein the first path is associated with a source primary cell, wherein the second path is associated with a target primary cell.

3. The apparatus of claim 1, wherein the determination is based on a service attribute, wherein the processor is further configured to cause the UE to:
determine a first quality of service of the first portion of the first uplink data, wherein duplicating the first portion is based on the first quality of service; and
determine a second quality of service of the second portion of the first uplink data, wherein transmitting the second portion on only the first path is based on the second quality of service.

4. The apparatus of claim 1, wherein the first portion includes a first flow associated with high reliability and the second portion includes a second flow associated with normal reliability.

5. The apparatus of claim 1, wherein the processor is further configured to cause the UE to:
receive, from the cellular network, a previous duplication parameter including an indication specifying a non-duplication mode for the first uplink data;
determine that the first uplink data includes a high reliability packet; and
transmit, to the cellular network, a message indicating a preference for a partial duplication mode, wherein the first duplication parameter is responsive to the message, wherein the high reliability packet is part of the first portion.

6. The apparatus of claim 1, wherein the processor is further configured to cause the UE to:
receive, at a first time from the cellular network, a first downlink packet using downlink duplication, wherein duplicating the first portion is in response to the first downlink packet using downlink duplication.

7. The apparatus of claim 6, wherein the processor is further configured to cause the UE to:
receive, at a second time from the cellular network, a second downlink packet using only the first path for downlink reception, wherein transmitting the second portion using only the first path is in response to the second downlink packet using only the first path for downlink reception.

8. The apparatus of claim 6, wherein the processor is further configured to cause the UE to:
start a timer in response to the first downlink packet, wherein transmitting the second portion using only the first path is in response to expiration of the timer.

9. The apparatus of claim 1, wherein the processor is further configured to cause the UE to:

receive an uplink grant from the cellular network, wherein the uplink grant includes a duplication indication, wherein the determination is based on the duplication indication.

10. A method for managing transmissions of a user equipment device (UE), the method including:
at the UE:
establishing a connection with a cellular network, wherein the connection includes a first path and a second path;
receiving, from the cellular network, at least one duplication parameter;
dynamically determining, based at least in part on the at least one duplication parameter, whether to duplicate transmission of a first uplink transmission, wherein the dynamic determination is further based at least in part on radio link conditions; and
transmitting the first uplink transmission on one or more of the first path or the second path in accordance with the dynamic determination, wherein said transmitting includes:
at a first time, transmitting on the first path; and
at a second time, duplicating transmission on the first path and the second path.

11. The method of claim 10, the method further including:
receiving, from the cellular network, at least a first threshold; and
performing measurements of radio link conditions, wherein to dynamically determine whether to duplicate transmission of the first uplink transmission includes comparing the measurements to the first threshold.

12. The method of claim 11, the method further including:
receiving, from the cellular network, at least a second threshold; and
comparing the measurements to the second threshold, wherein the measurements include a quality of the first path and a quality of the second path, wherein to dynamically determine whether to duplicate transmission of the first uplink transmission includes:
if the quality of the first path is better than the first threshold, transmitting on the first path;
if the quality of the second path is better than the first threshold and the quality of the first path is worse than the second threshold, transmitting on the second path; and
if the quality of the first path is worse than the first threshold and if the quality of the second path is worse than the first threshold, duplicating transmission.

13. The method of claim 10, the method further including:
performing measurements of the radio link conditions, wherein the measurements include measurements of reference signal received power and block error rate.

14. The method of claim 10, wherein the radio link conditions include a radio link control (RLC) failure.

15. A user equipment device (UE), including:
a radio; and
a processor operably connected to the radio and configured to cause the UE to:
establish a connection with a network, wherein the connection includes at least a first bearer and a second bearer;
receive, from the network, a radio link control (RLC) parameter for the first bearer;
transmit data to the network using the first bearer and the second bearer;
detect an RLC failure on the first bearer, wherein detecting the RLC failure is based at least in part on the RLC parameter;
suspend transmission of data to the network on the first bearer;
send information about the RLC failure to the network; and
continue to transmit data to the network using the second bearer.

16. The UE of claim 15, wherein the processor is further configured to cause the UE to:
mitigate the RLC failure.

17. The UE of claim 16, wherein to mitigate the RLC failure, the processor is further configured to cause the UE to:
receive an indication, from the network, of a reconfiguration of the first bearer; and
implement the reconfiguration of the first bearer.

18. The UE of claim 16, wherein to mitigate the RLC failure, the processor is further configured to cause the UE to:
autonomously activate a third bearer.

19. The UE of claim 16, wherein to mitigate the RLC failure, the processor is further configured to cause the UE to:
perform a handover.

20. The UE of claim 16, wherein to mitigate the RLC failure, the processor is further configured to cause the UE to:
duplicate the first bearer.

* * * * *